United States Patent
Sion et al.

(10) Patent No.: US 10,902,511 B2
(45) Date of Patent: Jan. 26, 2021

(54) METHODS AND APPARATUS FOR PROVIDING INFORMATION TO A USER OF A MOBILE DEVICE RELATING TO A CONTEMPLATED TRANSACTION

(71) Applicant: Movencorp Inc., New York, NY (US)

(72) Inventors: Alexander Sion, Brooklyn, NY (US); Brett King, New York, NY (US); Mohamed Khalil, New York, NY (US)

(73) Assignee: Movencorp Inc., New York, NY (US)

( * ) Notice: Subject to any disclaimer, the term of this patent is extended or adjusted under 35 U.S.C. 154(b) by 123 days.

(21) Appl. No.: 16/273,782

(22) Filed: Feb. 12, 2019

(65) Prior Publication Data

US 2019/0197614 A1    Jun. 27, 2019

Related U.S. Application Data

(60) Continuation of application No. 15/624,812, filed on Jun. 16, 2017, now Pat. No. 10,217,162, which is a
(Continued)

(51) Int. Cl.
*G06Q 40/00* (2012.01)
*G06Q 30/02* (2012.01)
(Continued)

(52) U.S. Cl.
CPC .......... *G06Q 40/00* (2013.01); *G06Q 20/322* (2013.01); *G06Q 30/0207* (2013.01);
(Continued)

(58) Field of Classification Search
CPC ....... G06Q 40/00; G06Q 40/12; G06Q 20/322
(Continued)

(56) References Cited

U.S. PATENT DOCUMENTS 7,606,750 B1 * 10/2009 Hoag ................... G06Q 20/108
705/30
8,301,501 B1    10/2012 Glaeser et al.
(Continued)

FOREIGN PATENT DOCUMENTS

WO    WO 2013/033593 A1    3/2013

OTHER PUBLICATIONS

International Preliminary Report on Patentability for International Application No. PCT/US2014/026549 dated Sep. 24, 2015.
(Continued)

*Primary Examiner* — Suezu Ellis
(74) *Attorney, Agent, or Firm* — Wolf, Greenfield & Sacks, P.C.

(57) ABSTRACT

Some embodiments of the invention provide tools for promoting a user's financial well-being by encouraging positive financial behavior through timely feedback, counseling and instruction. For example, some embodiments of the invention may provide real-time (e.g., in response to a transaction being performed, or in response to the user indicating he/she is contemplating a transaction) useful analysis and advice designed to encourage the type of ongoing financial behavior that leads over time to financial well-being. In some embodiments, transactions performed by the user during an ongoing period may be compared to transactions performed during one or more prior periods. It may be determined, as a result of the comparing, that the user is contemplating performing a transaction, and a promotional offer relating to the contemplated transaction may be sent to the user's mobile device in response to the determining.

12 Claims, 16 Drawing Sheets

Related U.S. Application Data division of application No. 14/774,509, filed as application No. PCT/US2014/026549 on Mar. 13, 2014, now abandoned.

(60) Provisional application No. 61/784,166, filed on Mar. 14, 2013.

(51) Int. Cl.
  *G06Q 20/32* (2012.01)
  *G06Q 50/00* (2012.01)
(52) U.S. Cl.
  CPC ..... *G06Q 30/0218* (2013.01); *G06Q 30/0226* (2013.01); *G06Q 50/01* (2013.01)
(58) Field of Classification Search
  USPC ......... 235/375, 379, 380; 705/14.21, 30, 35, 705/341
  See application file for complete search history.

(56) References Cited

U.S. PATENT DOCUMENTS

| | | | |
|---|---|---|---|
| 8,639,622 B1* | 1/2014 | Moore | G06Q 20/00 705/43 |
| 10,217,162 B2 | 2/2019 | Sion et al. | |
| 2002/0156710 A1 | 10/2002 | Ryder | |
| 2003/0026404 A1 | 2/2003 | Joyce et al. | |
| 2006/0241966 A1 | 10/2006 | Walker et al. | |
| 2007/0150361 A1 | 6/2007 | Kreiner et al. | |
| 2008/0077459 A1 | 3/2008 | Desai et al. | |
| 2009/0271287 A1 | 10/2009 | Halpern | |
| 2010/0250421 A1 | 9/2010 | Ariff et al. | |
| 2010/0268629 A1 | 10/2010 | Ross et al. | |
| 2011/0184742 A1 | 7/2011 | Lynch | |
| 2011/0184988 A1 | 7/2011 | Bishop | |
| 2011/0225079 A1 | 9/2011 | Davidson | |
| 2011/0320325 A1* | 12/2011 | Preston | G06Q 40/12 705/30 |
| 2012/0054031 A9 | 3/2012 | Walker et al. | |
| 2012/0232968 A1 | 9/2012 | Calman et al. | |
| 2013/0054314 A1 | 2/2013 | Ross et al. | |
| 2013/0282542 A1* | 10/2013 | White | G06Q 40/00 705/35 |
| 2014/0012691 A1* | 1/2014 | Hanson | G06Q 20/42 705/21 |
| 2014/0074688 A1 | 3/2014 | Shvarts et al. | |
| 2014/0156392 A1 | 6/2014 | Ouimet et al. | |
| 2014/0244476 A1 | 8/2014 | Shvarts et al. | |
| 2014/0372340 A1 | 12/2014 | Brown, III | |
| 2016/0034932 A1 | 2/2016 | Sion et al. | |
| 2016/0267595 A1 | 9/2016 | Rauls et al. | |
| 2017/0287064 A1 | 10/2017 | Sion et al. | |

OTHER PUBLICATIONS

International Search Report and Written Opinion for International Application No. PCT/US2014/026549 dated Sep. 29, 2014.
Invitation to Pay Additional Fees for International Application No. PCT/US2014/026549 dated Jul. 15, 2014.
Gordon, How to create (and stick to) a realistic budget with Mint. LifeHacker. Jan. 5, 2011:8 pages. http://lifehacker.com/5725282/how-to-create-and-stick-to-a-realistic-budget-with-mint [last accessed Jun. 26, 2014].

* cited by examiner

METHODS AND APPARATUS FOR PROVIDING INFORMATION TO A USER OF A MOBILE DEVICE RELATING TO A CONTEMPLATED TRANSACTION

RELATED APPLICATIONS

This application is a continuation of U.S. patent application Ser. No. 15/624,812, filed Jun. 16, 2017, entitled METHODS AND APPARATUS FOR PROMOTING FINANCIAL BEHAVIORAL CHANGE, which is a divisional of U.S. patent application Ser. No. 14/774,509, filed Sep. 10, 2015, entitled METHODS AND APPARATUS FOR PROMOTING FINANCIAL BEHAVIORAL CHANGE, which is a national stage application filed under 35 U.S.C. § 371 of PCT Application Serial No. PCT US2014/026549, filed Mar. 13, 2014, entitled METHODS AND APPARATUS FOR PROMOTING FINANCIAL BEHAVIORAL CHANGE, which claims priority to U.S. Provisional Patent Application Ser. No. 61/784,166, filed Mar. 14, 2013, entitled METHODS AND APPARATUS FOR PROMOTING FINANCIAL BEHAVIORAL CHANGE. The entirety of each of the documents listed above is incorporated herein by reference.

BACKGROUND

Financial counseling and money management is often provided in one of three distinct ways: via a financial advisor/planner, via financial counseling, or via digital money management tools Individuals with sufficient assets often hire a financial advisor who can develop a plan for their future, typically focused on preparing for retirement, education and other life expenses by managing their investable assets. In pursuit of that goal, a financial advisor may examine their client's income and expenses to determine how much can be made available over time for these ongoing investments. The analysis to determine how their spending behavior impacts the availability of investable income is often relatively cursory, infrequent, and delayed. Financial advisors typically do not provide day-to-day advice on how their clients can make better money-related decisions. Rather, they typically examine client progress at most a few times a year, and use delayed transactional information collected from previous periods to counsel clients.

Individuals experiencing financial hardship may seek counseling on how to rehabilitate their finances. A counselor evaluates the client's financial situation to determine how he/she may best manage their income towards meeting financial obligations and goals. A counselor may assemble a financial plan, provide money management tools and exercises, and arrange for regularly scheduled evaluations with the client. Financial counselors typically do not provide day-to-day advice on how clients can make better money decisions. Moreover, interactions with the client are often infrequent, and their analysis is delayed. A counselor may instruct a client to regularly log on to their online bank account to monitor their income and expenses to ensure that he/she remains on track to pay down debts. In this example the client will often not interact with a financial counselor again unless they go off track.

All individuals also have access to online services that allow a user to perform a superficial analysis of their finances. A user may provide a service with access to their financial data. The service may then aggregate information from multiple accounts, categorize the transactions, and provide the user with some insight as to how his/her money is being spent. For example, a service may enable a user to see how much he/she regularly spends for goods or services in a given category, and compare that amount to a budgeted amount. While the user can access this information as frequently as they wish, the analysis is delayed by the amount of time it takes the service to collect the information from the user's financial accounts, typically a few hours and more often a few days.

SUMMARY

Some embodiments of the invention provide methods for encouraging and promoting a user's financial well-being by delivering timely insights, tools and incentives. Rather than reviewing a user's financial history in hindsight, some embodiments of the invention provide timely insights, such as when a transaction is performed, or when a user indicates he/she is contemplating a transaction. These insights may be designed to encourage spending and saving behaviors that lead to an improved financial well-being. Further, some embodiments of the invention may incent a user to maintain or improve their financial well-being by offering access to services, special offers, discounts, etc. Some of these incentives may bolster the user's financial wellness over time, creating a cycle of positive behavioral reinforcement. Additionally, some embodiments may employ social aspects in encouraging positive financial habits. For example, one or more social networks to which a user belongs could be used as a platform for delivering insights and feedback, and/or information gleaned from the social network(s) may be used to provide insights and feedback.

In some embodiments of the invention, a framework is provided for interacting with a user at three main levels: at the transaction level, at the intermediate ("budget") level, and at the high ("overall financial wellness") level. Interaction with a user at the transaction level may involve providing immediate feedback on transactions which the user has performed, or indicates they are considering performing. To provide timely feedback, some embodiments of the invention may provide for interaction with the user via a mobile device, such as a cellular telephone, smartphone, tablet device, and/or any other suitable mobile device. When the user completes or indicates she is considering a particular transaction, some embodiments may provide immediate, helpful insights via the mobile device which encourage behavior that promotes financial well-being. (The pronouns "she" and "her" are used as substitutes for "his/her" and "he/she" throughout the description that follows, for simplicity and readability, although it is to be understood that the aspects of the invention disclosed herein have equal applicability to, and equal usefulness for, all users regardless of gender.) For example, after purchasing a coffee at a coffee store, a user may receive a notification via her mobile device that she has spent $300 that month at the same coffee store. This insight puts the individual transaction just completed into larger context for the user, and may alter the user's thinking on future financial decisions, such as whether to buy a coffee tomorrow as opposed to making it at home, whether to spend more money on entertainment that month, etc.

Interaction with the user at the intermediate level may include providing an analysis of how transactions performed now affect the user's finances over a more extended period, such as in relation to a monthly budget. For example, the user's spending in previous months may be analyzed to model a "typical" month, and transactions occurring during the present month may be analyzed (e.g., as they occur) to determine whether the user has deviated from her typical monthly spending. If so, she may be informed of the effects of the transaction on their monthly budget. For example, the user may be informed that as a result of purchasing coffee at a coffee store that morning, she will exceed their budgeted monthly expenses unless she reduces her spending to $5 per day. This type of feedback puts the user's minute-by-minute financial decisions into a monthly context, and enables the user to see that each transaction has an immediate effect on their longer-term financial health.

Interaction at the highest level may involve providing the user with an indication of her overall financial well-being (e.g., in the form of a score), which may reflect the user's ability to sustain their savings levels, and increase her net worth over time. Further, some embodiments of the invention may contextualize individualize transactions within the user's overall financial well-being, so that the user sees the effect of day-to-day habits on her long-term financial health. For example, after completing a transaction at a coffee shop, the user may be informed that if she continues to buy coffee every day, so that her regular coffee expense is $200 per month, then her "financial wellness score" score will decrease from X to Y. The user may also be informed that by directing that amount into savings instead, she could achieve a personal savings goal of $X by Y date, could reduce her overall debt X % by Y date, etc., which would increase her score from X to Z. This type of feedback may encourage the user to engage in the type of daily financial behaviors that lead to financial security over time.

Further, in some embodiments of the invention, the user may earn "points" or rewards as a result of attaining a particular financial wellness score, completing certain financial wellness tasks, or achieving certain financial wellness goals. Users may redeem those points for rewards, discounts, offers, etc., and other items that may further reinforce their financial wellness. This positive reinforcement is designed to lead to a cycle of behaviors that may be beneficial to the user.

Some embodiments of the invention may employ social aspects in encouraging positive financial habits. For example, in some embodiments, one or more social networks to which a user belongs could be used as a platform for delivering insights and feedback, and/or information gleaned from the social network(s) may be used to provide insights and feedback. This may take any of numerous forms. As one example, if a social network allows users to schedule events and invite other users to attend, then some embodiments of the invention may employ this information to promote financial planning relating to the event. For instance, if a user is invited to a birthday party, then the user may be encouraged to regularly set aside savings until the date of the party arrives to buy a birthday gift. In another example, information about a user's connections (e.g., "friends") within a social network, and/or about the user's expressed preferences, may be used in providing recommendations (e.g., about restaurants or other service providers that represent good value, so as to anticipate and prevent impulsive decisions), or promotional offers or rewards (e.g., from merchants for which a user has expressed an affinity, from merchants referred by one user to another user, etc.).

In other examples, information gathered from social networks may be used as a vehicle to perform user-to-user financial comparisons (e.g., to track users' progress against a common goal), encourage users to abide by financial commitments (e.g., by enabling a user to announce a financial goal to her connections, who may provide encouragement as she works to achieve it), and provide indicia of financial status (e.g., recognition for a user's having reached a financial goal). Social networks, and the information provided thereby, may have any of numerous uses in relation to the embodiments of the invention described herein.

BRIEF DESCRIPTION OF DRAWINGS

The accompanying drawings are not intended to be drawn to scale. In the drawings, each identical or nearly identical component as illustrated in various figures is represented by a like numeral. For purposes of clarity, not every component may be labeled in every drawing. In the drawings.

DETAILED DESCRIPTION

I. Architecture

Figure 1:
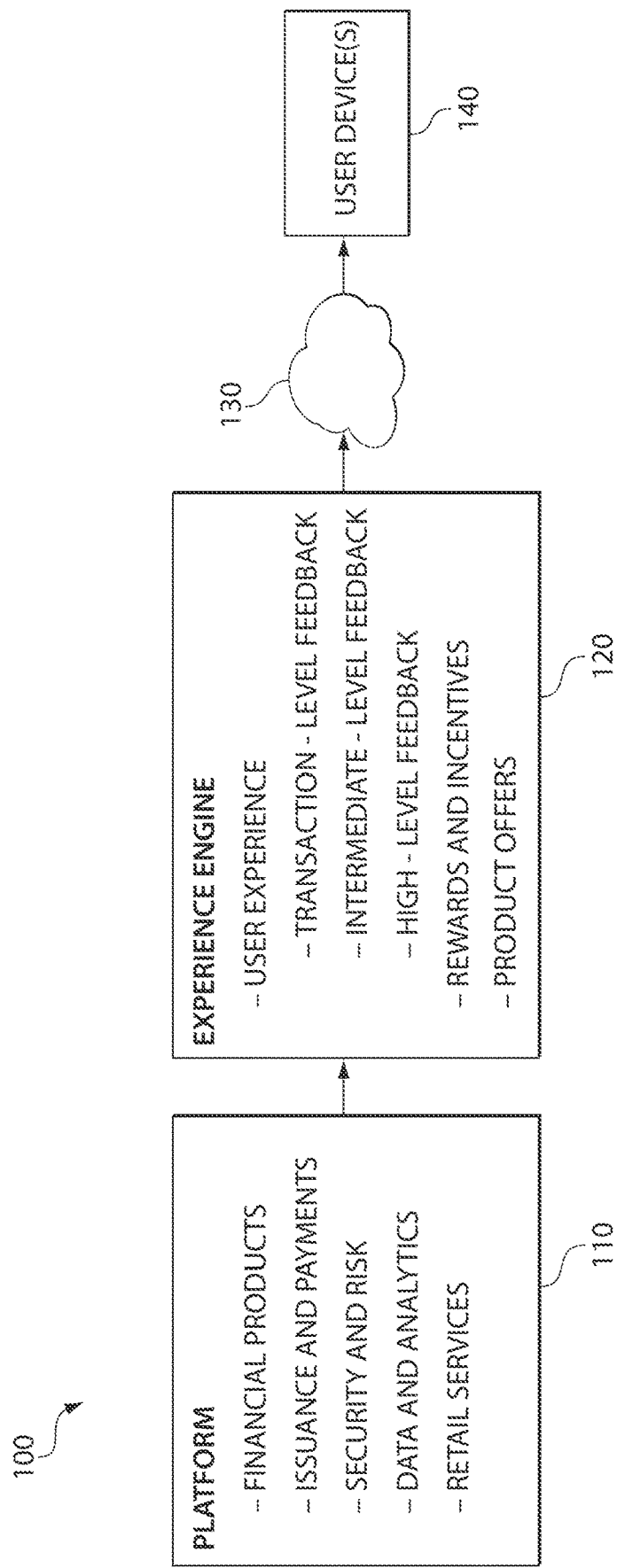
FIG. 1 is a block diagram depicting components of a system designed to encourage positive financial behavior in users, in accordance with some embodiments of the invention.

Some embodiments of the invention provide a system which supports timely, helpful interactions with users to motivate positive behavior that leads over time to improved financial well-being. FIG. 1 depicts components of representative system 100, which includes experience engine 120, user device(s) 140 and platform 110. In general, the experience engine 120 processes information provided by platform 110 to create a user experience that is delivered to user device(s) 140 via network(s) 130. As described further below, the user experience may incorporate transaction-level insights, intermediate-level feedback (e.g., which places individual transactions into a larger context), and high-level guidance (e.g., reflecting the user's overall financial wellness).

Recognizing the ubiquity of mobile devices, the value of timeliness in providing useful feedback to users, and the fact that many transactions are performed by users when they are away from home, some embodiments of the invention provide for communicating with users via mobile devices (e.g., a cellular telephone such as a "smartphone," a tablet device, a laptop computer, a handheld game console, a portable media player, and/or any other suitable mobile device). In some embodiments of the invention, aspects of the user experience may be delivered via the World Wide Web, such that a mobile web browser executing on the user's mobile device(s) may display feedback to the user. However, embodiments of the invention are not limited to such an implementation, as any suitable content delivery mechanism(s) may be used. For example, a mobile device may execute one or more standalone applications which provide "in-app" feedback to the user.

Notwithstanding the foregoing, embodiments of the invention are not limited to providing feedback to users via mobile devices, as any suitable device may be used. For example, a user may receive feedback via a desktop computer, other type of non-mobile personal computer, network console, and/or any other suitable device.

In representative system 100, experience engine 120 draws upon the data and/or processing capability provided by platform 110. Some representative types of data and/or processing capabilities which platform 110 may provide include those related to financial products (e.g., those which are either used by, or may be offered to the user, such as deposit accounts, borrowing, investments, etc.; and/or the management of financial product accounts, of regulatory compliance, or customer service), issuance and payments (e.g., card issuance, mobile wallets, customer service, payment processing, monitoring and reporting, fraud prevention, etc.), security and risk (e.g., identity validation, biometric authentication, account security, etc.), data and analytics (e.g., account aggregation, social networks, credit bureau integration, etc.), and retail services (e.g., merchant offers, merchant loyalty accounts). Platform 110 may supply information and/or processing capability to experience engine 120 in any suitable form, using any suitable technique(s) and/or infrastructure. Further, platform 110 may comprise any suitable number and type of computing systems and/or storage facilities, and information and processing capabilities may be distributed among the system(s) and facility(ies) in any suitable fashion.

II. Transaction-Level Interaction

Some embodiments of the invention provide for user interaction at the individual transaction level, which may involve providing timely feedback on transactions the user has just completed, or indicates she is contemplating.

For example, some embodiments of the invention may interact with the user via a mobile device. When the user completes or indicates she is considering a particular transaction, timely, helpful insights and context may be provided to the user via the mobile device to encourage positive financial behavior.

Figure 2:
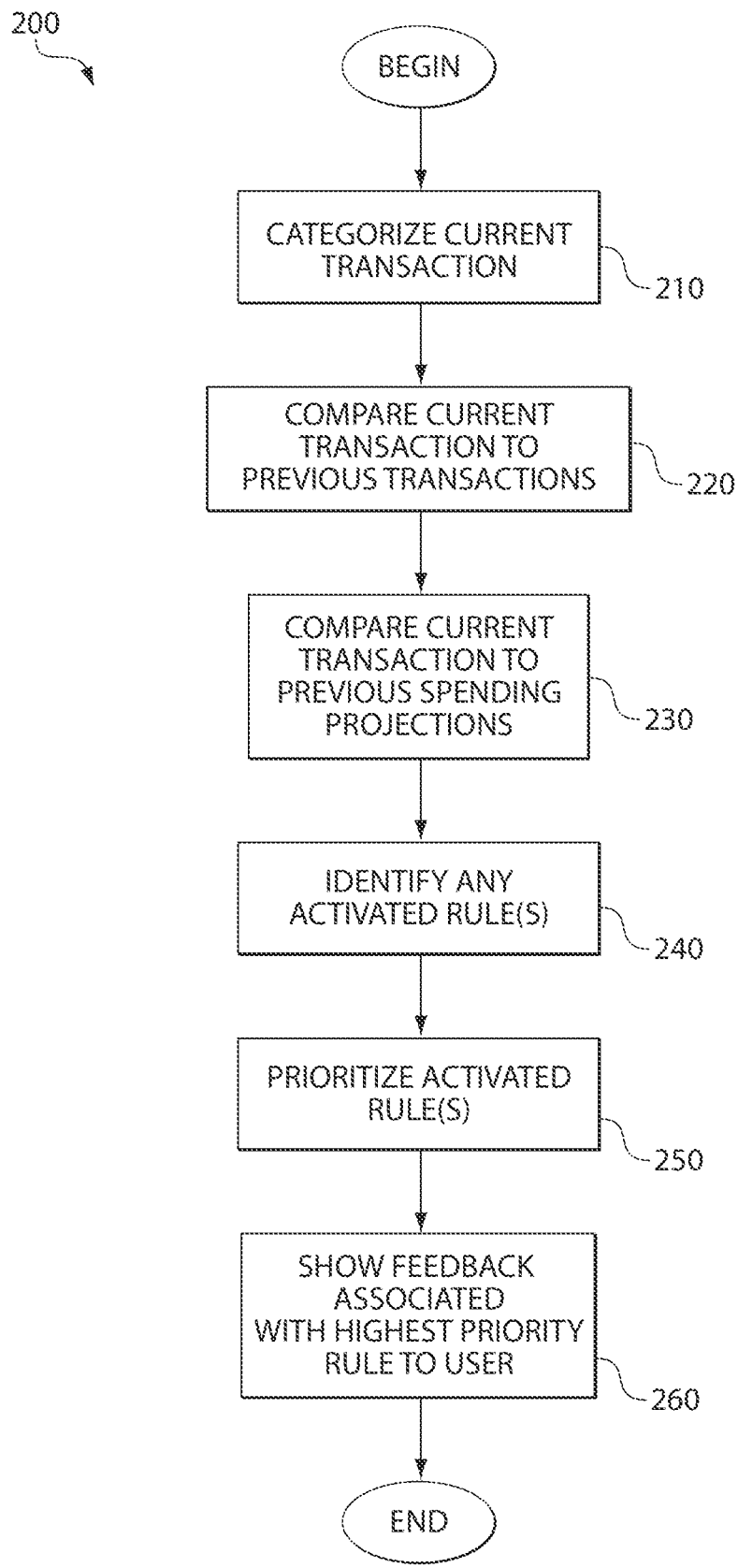
FIG. 2 is a flowchart depicting a representative process for providing transaction-level feedback to a user, in accordance with some embodiments of the invention.

Some embodiments of the invention analyze information relating to a "current" (e.g., completed, contemplated, etc.) transaction to determine the type of feedback that is to be provided to the user as a result of performing that transaction. FIG. 2 shows a representative technique 200 for making such a determination.

At the start of process 200, the current transaction is categorized in act 210. This categorization may be performed in any of numerous ways. In some embodiments, the transaction categorization scheme shown in Table 1 may be used.

TABLE 1

Transaction Categorization Scheme.

| Super-category | Category | Sub-category | Description |
|---|---|---|---|
| MONEY OUT | Spend | Goods & Services (Shopping & Services, Shopping & Personal, | Everything from clothes to haircuts, electronics to spa days, toys to dry cleaning, all the nice things you like to pay for (Clothing, Electronics, Toys, Dry Cleaning, Spas, Salons, etc.) |
| | | Restaurants & Bars (Dining Out, Dining & Drinks) | Eating and drinking out or ordering in (Restaurants, Delis, Bars & Nightclubs) |
| | | Hobbies & Entertainment | Things you watch or do for fun |
| | | Travel & Leisure | Getting away from it all for vacation or family (Hotels, Airlines, Cruises, Rental Cars & Taxis) |
| | | Fees & Interest | All the fees you pay to manage or borrow money (Fees, Penalties & Interest Charges) |
| | | Cash | When you can't pay with your phone or card |
| | Live | Home | A roof over your head and a bed to sleep in (Rent, Mortgage, Furnishings, Taxes, Insurance, Maintenance, Repair) |
| | | Groceries & Supplies | Cook, eat, clean, repeat (Food, Household Supplies, Incidentals) |
| | | Getting Around (Commute & Transportation) | The way you get to work and back (Subway, Bus, Auto, Tolls, Gas, Registration, Insurance, Maintenance, Repair) |
| | | Health & Fitness | Staying in shape, getting your checkups, taking your medicine (Doctor, Dentist, Pharmacy & Gym) |

TABLE 1-continued

Transaction Categorization Scheme.

| Super-category | Category | Sub-category | Description |
|---|---|---|---|
| | | Education | Getting you and your family smarter every day (School, Books, & Student Loan Payments) |
| | | Utilities | All the basics you need to survive in the 21$^{st}$ century (Water, Cable, Mobile, Gas & Electric Bills) |
| | Give | Donations | Giving to a good cause (Charities, Organizations, Causes) |
| | | Gifts | It's the thought that counts (Presents to Family, Friends & Neighbors) |
| SAVE | Save | Save | Deposit, Withdrawal, Interest, Etc. (Savings Accounts Only) |
| EARN | Earn | Income | |
| | | Taxes | |
| | | Expenses & Reimbursements | Business Expenses & Reimbursements |
| OTHER | Skip | Account Transfers | Transfers between accounts |
| | | Payments | Payments to accounts you have already linked |

Act 210 may, in some embodiments, involve not only assigning a super-category, a category and a sub-category to the transaction (in accordance with the scheme set forth in Table 1), but also further identifying an associated merchant and brand. For example, for a transaction assigned to the "money out" super-category, "spend" category, and "goods and services" sub-category, the merchant may be the business from which the user purchased the goods or services, and the brand may be the brand of goods or services purchased.

Process 200 then proceeds to act 220, wherein the current transaction is compared to previous transactions performed by the user. The previous transactions may have occurred over any suitable period. For example, the previous transactions may have occurred during the same day, during the previous week, month, quarter, year, and/or other suitable time period. In some embodiments, the amount of the current transaction may be compared to a mean and/or median amount of the previous transactions occurring during the identified period having the same merchant and/or brand as the current transaction. The result of the comparison may be an amount and/or percentage by which the current transaction amount exceeds or is less than the mean and/or median transaction amount over the identified time period for the identified merchant and/or brand.

Process 200 then proceeds to act 230, wherein the current transaction is compared to the user's previous projections of spending amounts. These spending amounts may have been projected to occur over any suitable time period. For example, the projected spending amounts may have been planned to occur over the current day, during the next week, month, quarter, year, and/or other suitable time period. The spending amounts may also relate to particular combinations of super-categories, categories, and sub-categories. For example, a projected spending amount may indicate an amount the user intended to spend in the "money out" super-category, "spend" category, and "restaurants and bars" sub-category over the next month. Using this example to illustrate, the amount of the current transaction may be compared to the projected amount for the next month for this super-category, category, and sub-category combination. The result of the comparison may be an amount and/or percentage by which the current transaction amount exceeds or is less than the projected spending amount for the identified period for the identified super-category, category, and sub-category combination.

A summary of some typical comparisons which may be performed in acts 220-230, and the results of those comparisons, is shown in Table 2.

TABLE 2

Comparison Summary.

| Transaction Category | Comparison Result | Time Period |
|---|---|---|
| Transaction | %/$ Above Mean/Median | D/W/M/Q/Y |
| Merchant | %/$ Below Mean/Median | D/W/M/Q/Y |
| Brand | %/$ Above Projected Spend | D/W/M/Q/Y |
| Sub-Category | %/$ Below Projected Spend | D/W/M/Q/Y |
| Category | %/$ Below Projected Spend | D/W/M/Q/Y |
| Super-Category | %/$ Below Projected Spend | D/W/M/Q/Y |

Process 200 then proceeds to act 240, wherein any rules which are activated by the result of the comparisons performed in acts 220-230 are identified. Rules may, for example, be predefined, or may be defined dynamically. Some representative rules are set forth in Table 3.

TABLE 3

Comparison Summary.

| Group | Rule | Category | Rule Activation | Indication |
|---|---|---|---|---|
| A | 1 | Sub Category | Actual > Typical | Transaction exceeds projected spending in sub-category for specified time period. |
| A | 2 | Merchant | Actual > Typical | Transaction exceeds mean/median amount over specified time period. |
| B | 3 | Transaction | Actual > Typical | Transaction exceeds mean/median amount over specified time period. |
| B | 4 | Sub Category | Actual <= Typical | Transaction is less than or equal to projected spending in sub-category for specified time period. |

TABLE 3-continued

Comparison Summary.

| Group | Rule | Category | Rule Activation | Indication |
|---|---|---|---|---|
| C | 5 | Merchant | Actual <= Typical | Transaction is less than or equal to mean/median amount over specified time period. |
| C | 6 | Transaction | Actual <= Typical | Transaction is less than or equal to mean/median amount over specified time period. |

As Table 3 indicates, in this example, each rule is assigned to a group. In act 250, rules that were activated in act 240 are prioritized, across and within groups. A representative procedure for prioritizing rules is set forth in Table 4.

TABLE 4

Representative Rule Prioritization Scheme.

| Step | Logic |
|---|---|
| 1 | Select activated rule(s) which are associated with "highest" group, with group A being the highest group, and group C being the lowest group |
| 2A | If the highest group is group A, then select the rule with the greatest associated difference between the actual transaction amount and the typical transaction amount |
| 2B | If the highest group is group B, then select rule 3 over rule 4 |
| 2C | If the highest group is group C, then select the rule with the lowest associated difference between the actual transaction amount and the typical transaction amount |

Process 200 then proceeds to act 260, wherein feedback associated with the rule determined to have the highest priority is shown to the user, and process 200 then completes.

Figure 3:
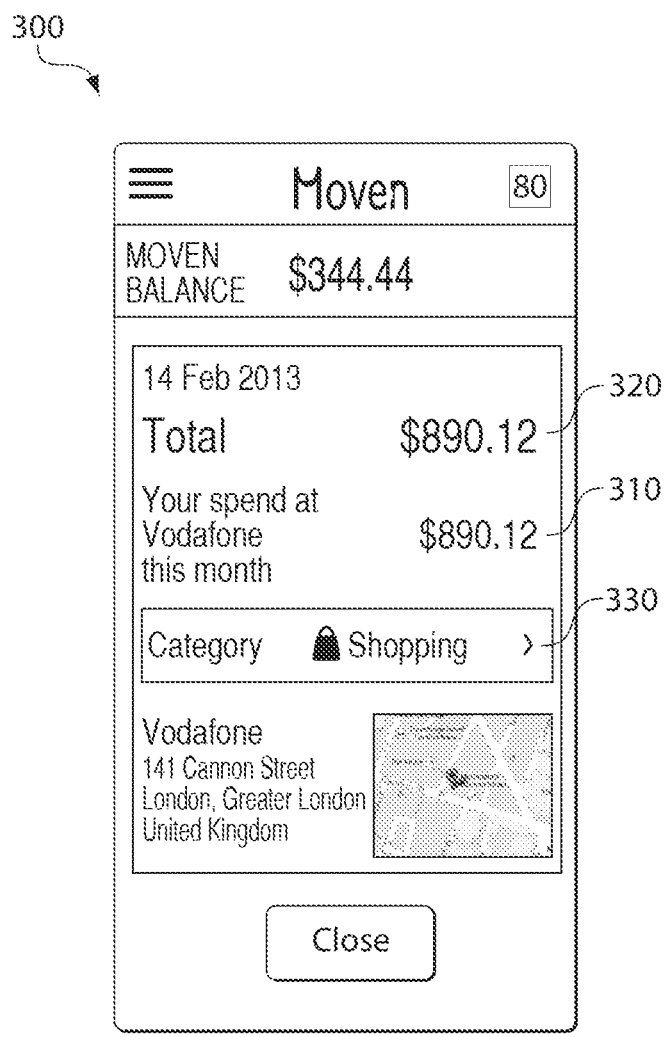
FIG. 3 depicts a representative screen interface showing an example of transaction-level feedback which may be presented to a user, in accordance with some embodiments of the invention.

One example of the types of feedback which may be displayed to a user, as part of a "receipt" for the transaction that may be displayed by the user's mobile device, is shown in FIG. 3. In this example, feedback portion 310 of receipt 300 indicates that the user spent $890.12 at the merchant "Vodaphone" in the last month, and as a result that rule 2 in Table 3 was activated, and that either rule 2 had a greater associated difference (not shown) between the transaction amount (shown at 320) and the typical transaction amount (also not shown) than the difference associated with rule 1, or that rule 1 was not activated.

Receipt 300 may include categorization section 330, which indicates the sub-category to which the transaction was assigned in act 210 of process 200 (FIG. 2). In some embodiments of the invention, the user may update the sub-category, category and/or super-category by supplying input (e.g., touch input) to the mobile device. For example, the user may change the transaction from the "shopping" sub-category under the "spend" category to the "home" sub-category under the "live" category. In some embodiments of the invention, if the user changes the sub-category, category and/or super-category of the transaction, acts 220-260 of process 200 may be repeated, to display new feedback to the user, if appropriate.

Although not shown in FIG. 3, in some embodiments, a receipt may include insights which place the transaction into a longer-term context. For example, if a receipt is associated with a purchase transaction, then it may indicate that as a result of the transaction, the user has $X left to spend that week in a particular category to stay on budget. If the receipt is for a savings transaction, then it may indicate that the amount saved is less than the typical amount saved on a weekly basis, and as a result, the user may need to save extra money each remaining week in the month to stay on track to achieve savings goals.

It should be appreciated that by providing timely feedback on individual transactions, embodiments of the invention may bring to the user's attention those behaviors which may jeopardize her long-term financial well-being, and/or encourage behavior that strengthens her financial well-being over time.

It should also be appreciated that embodiments of the invention are not limited to comparing a transaction to previous transactions performed by the same user, as some embodiments of the invention may support peer-to-peer comparisons. For example, a purchase transaction of $75 by a first user at a particular restaurant may initiate a comparison with purchase transactions performed by other users, which may lead to the first user being notified that other users typically spend $60 on average at the same restaurant, or that other users typically spend 10% less at another, higher-rated restaurant serving the same cuisine and located a block away. This insight may alter the first user's future decisions regarding dining out.

It should further be appreciated that embodiments of the invention are not limited to providing feedback in response to a transaction which has already occurred. For example, some embodiments of the invention may enable users to identify a transaction she is contemplating, to allow the user to understand the proposed transaction's effect on her finances. For example, a user may indicate that she is considering having dinner at a particular restaurant, and she may be notified of the amount that other users typically spend at that restaurant, or that another, higher-rated restaurant nearby is offering promotional discounts to new customers which could lead her to spend less on dinner.

In this respect, some embodiments of the invention may permit offering location-based and/or event-based discounts to users. For example, if a user makes a $5 purchase at a first coffee shop, then a coupon may be sent to the user which allows her to purchase the same drink for $4 at a different coffee shop down the street. Alternatively, the user may receive a notification that the first coffee shop is thankful to have the user as a customer, and offers loyalty points which enable the user to purchase a free coffee every fifth visit. Offers such as these may be accompanied by other feedback which encourages positive financial behavior. For example, the user may be encouraged to take the money that she would have spent on coffee if she hadn't received the offer and direct it toward her savings.

Some embodiments of the invention may provide for evaluating promotional offers received from multiple merchants, to identify the best deal for the user. For example, if the user indicates that she is about to make a purchase, and becomes eligible for one or more promotional offers as a result, these offers may be assessed to identify the one which results in the user spending the least amount of money and/or represents a purchase which most closely aligns with her preferences, which may be expressed by the user and/or gleaned from previous financial activity.

III. Intermediate-Level Interaction

Interaction with the user at the intermediate level may include providing an analysis of how transactions performed or contemplated now affect the user's finances over a more extended period, such as in relation to a monthly budget. For example, in some embodiments, the user's spending in previous months may be analyzed to model a "typical" or "predicted" month, and activity occurring during the present month may be analyzed to determine whether it causes the user to deviate from a typical or predicted month's activity. If so, the user may be informed of the effects of the activity on her monthly and longer-term plans.

Figure 4:
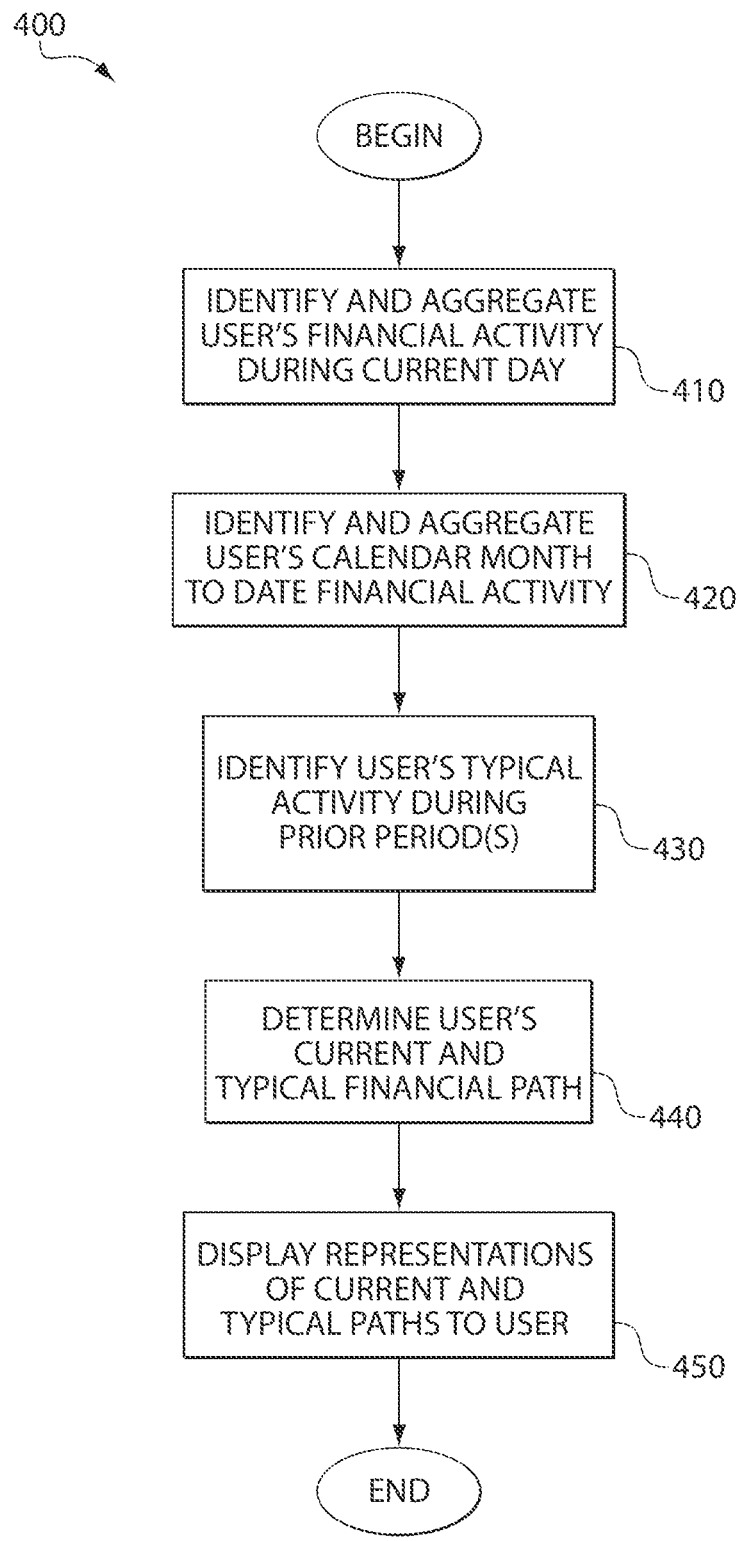
FIG. 4 is a flowchart depicting a representative process for comparing a user's current financial path within a period to the user's typical financial path in comparable periods, in accordance with some embodiments of the invention.

FIG. 4 depicts a representative process 400 for comparing the user's current financial activity to the user's "typical" or "predicted" financial activity. In this example, the user's current and typical financial activity are over a "calendar" month (e.g., the month of June, September, etc.), but it should be appreciated that embodiments of the invention are not limited to such an implementation. For example, a user's current and typical financial activity may be over a calendar week, quarter, and/or year, or a number of days preceding the current day, such as the prior week, the prior month (e.g., the last 30 days), the prior quarter, etc. Any suitable time period(s), beginning and ending on any suitable date, may be used. Various statistical and econometric techniques may be used to further refine projected transactional activities to improve the accuracy and confidence of "predicted" behaviors. In some instances where the customer transactional history is limited, typical or predicted behaviors may be derived using socially sourced peer comparison data.

At the start of process 400, the user's financial activity during the current day is identified and aggregated in act 410. This may be performed in any one of numerous ways. In some embodiments, the classification scheme set forth in Table 1 may be used to classify transactions performed by the user, and transactions in the "save" super-category, and in the "money out" super-category within the "spend," "live" and "give" categories may be identified. Activity within the "spend," "live" and "give" categories may be further classified into sub-categories as shown in Table 1. In some embodiments, the transactions within each super-category, category and sub-category may be summed to yield the user's categorized financial activity for the current day.

In act 420, the user's calendar month-to-date financial activity is identified and aggregated. This, too, may be performed in any one of numerous ways. For example, the transactions within the super-categories, categories and sub-categories for which transactions were identified and aggregated in act 410 may be summed for all of the days from the first day of the current calendar month through the current day to yield the user's month-to-date financial activity.

In act 430, the user's typical financial activity for similar periods is identified. In this respect, a "similar" period may be defined in any one of several ways. For example, using one approach, the dates represented in the financial activity identified in acts 410 and 420 may be used as a basis for identifying financial activity for similar periods. For example, if the financial activity identified in acts 410 and 420 represents activity occurring from the $1^{st}$ through the $14^{th}$ of a particular month, then identifying the user's typical financial activity for similar periods may involve evaluating activity occurring from the $1^{st}$ through the $14^{th}$ of one or more prior months.

Other approaches are also possible. Using one alternative approach, the day of week and week(s) of month represented in the financial activity identified in acts 410 and 420 may be used as a basis for identifying financial activity for similar periods. For example, if the financial activity identified in acts 410 and 420 represents activity occurring from the first Monday through the second Friday of a particular month, then identifying the user's typical financial activity for similar periods may involve evaluating activity occurring from the first Monday through the second Friday of one or more prior months. Using another alternative approach, recurring transactions which occur on or around a specific day of the month within the calendar period represented in the financial activity identified in acts 410 and 420 may be identified, and then the remaining, non-recurring transactions may be identified using another approach (e.g., by using the dates represented in the financial activity identified in acts 410 and 420 as a basis for identifying the non-recurring transactions, by using the day of week and week(s) of month represented in the financial activity identified in acts 410 and 420 as a basis for identifying the non-recurring transactions, or by using an altogether different approach).

Although any one of numerous approaches may be used, the description of process 400 that follows assumes that the dates represented in the financial activity identified in acts 410 and 420 are used as a basis for identifying financial activity for similar periods.

Act 430 may also involve identifying prior periods in which the amount of activity supports a valid comparison with the current financial activity. In some embodiments, the prior periods which are identified to support comparisons of savings activity may not necessarily be the same as those prior periods which are identified to support comparisons of spending activity. For example, in some embodiments, the prior period(s) which are identified to support a comparison of spending activity may include the month(s) which begin with the first month for which the prior month's transactions in the "earn" super-category in Table 1 are greater than zero, and the prior period(s) which are identified to support a comparison of savings activity may include the month(s) which begin with the first month for which the prior month's transactions in the "save" super-category in Table 1 are greater than zero. Of course, embodiments of the invention are not limited to being implemented in this manner, as any suitable period(s) may be selected to provide spending and/or savings activity, in any suitable manner. For example, all prior months for which any spending and/or savings data exist may instead be used as a basis for comparison.

Given that some months have a different numbers of days than other months, some embodiments may provide for creating a construct to support valid comparisons of daily and month-to-date financial activity. For example, if the current day is the $31^{st}$ of the month, then a construct may be created which represents the $31^{st}$ of the month in previous months (even those which do not include thirty-one days), and which represents month-to-date activity through the $31^{st}$ of the month in previous months (even those which do not include thirty-one days). This may be performed in any of several ways. In some embodiments of the invention, in months which have fewer than thirty-one days, the activity occurring on the last day of the month is repeated for each successive day until the total number of days represented in the construct equals thirty-one. For example, for the month of June, which has thirty days, the activity occurring on June $30^{th}$ may repeated to represent the activity occurring on the fictitious day of June $31^{st}$. As a result, embodiments of the invention support valid comparisons of daily and month-to-date financial activity across months having a different number of days.

In some embodiments, the transactions for the days corresponding to the current day in the identified prior periods, and the transactions for the month-to-date periods corresponding to the current month-to-date period in the identified prior periods, for the super-categories, categories and sub-categories for which transactions were identified in aggregated in act 410, may be averaged to yield the user's typical day and typical month-to-date financial activity. Of course, embodiments of the invention are not limited to using the average transaction amount as a typical amount, as other approaches are possible. For example, a median transaction amount, peer comparison data, or more advanced statistical and econometric techniques may instead be used.

Process 400 then proceeds to act 440, wherein the user's current and typical "path" are determined. This determination may be performed in any one of several ways. For example, in some embodiments, the user's current and typical month-to-date totals, for each of the super-categories, categories and sub-categories for which transactions were identified in act 410, may be plotted in a Cartesian coordinate system, wherein the "x" coordinate is the date of the current month, and the "y" coordinate is a current or typical month-to-date total. The plots of current and typical activity for the super-categories, categories and sub-categories for which transactions were identified in aggregated in act 410, or for a subset thereof, are displayed to the user in act 450.

Figure 5:
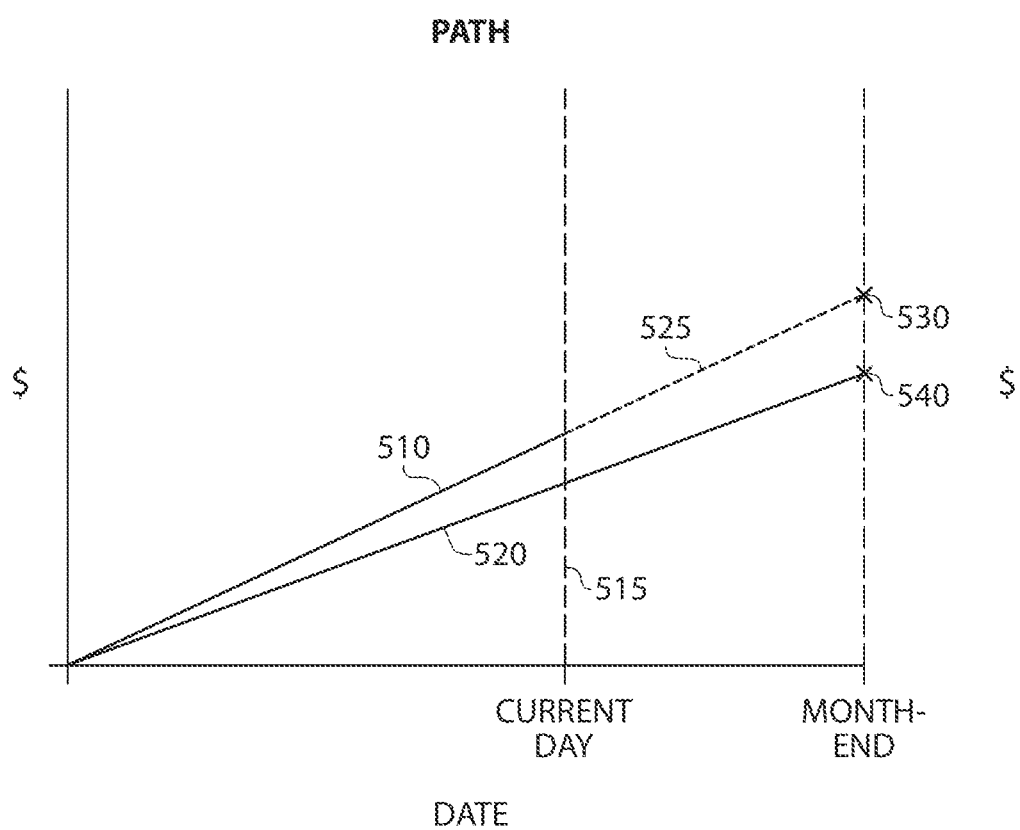
FIG. 5 is a graph depicting a user's current and typical financial path, in accordance with some embodiments of the invention.

As an example, FIG. 5 depicts a coordinate system 500 which illustrates a comparison between the user's current and typical monthly spending activity. In coordinate system 500, the dates of the current month are reflected on the x-axis, and the total amount spent is reflected on the y-axis. Thus, line 510 indicates the user's total spending activity as the month progresses, and extends to line 515, which represents the point representing the current day on the x-axis. The user's typical spending activity is represented by line 520, which extends to point 540 at month-end. Line 525 represents the user's spending if continued from the current day to the end of the month at its present trajectory. It can be seen that the user's spending extends to point 530 at month's end. An illustration of this type may assist the user in recognizing how everyday transactions add up over time, and can cause her to exceed budgeted monthly spending amounts. As such, it may cause the user to alter her thinking in relation to future financial activity, and enable her to take corrective action to put herself back on track. For example, a user to which the illustration of FIG. 5 is shown may recognize that her current spending trajectory will take her "above" point 540 on the graph, and may curtail her spending over the rest of the month so that her total spending approximates the budgeted amount.

The coordinate system of FIG. 5 represents merely one form of feedback that may be presented to a user, as a comparison between current and typical daily or month-to-date activity may yield numerous insights which may be useful to the user. As one example, a comparison performed by the user of her current month-to-date spending in the "restaurants and bars" sub-category to her typical month's spending in the same sub-category may indicate that, for example, she has spent much more in the current month than in typical previous months, which may encourage her to dine out less frequently for the remainder of the month. In another example, a comparison performed by the user of her typical monthly spending to her peers may encourage the user to contemplate targeting a lower typical monthly spend going forward.

Feedback may also come in the form of promotional offers or discounts. For example, if an analysis of current and typical month-to-date savings activity indicates that the user may be saving for a major purchase (perhaps the user has a savings fund set aside, called "new TV"), then promotional offers may be presented which include coupons for electronics purchases at specific retailers. If an analysis of current and typical month-to-date spending activity suggest that the user may be accumulating credit card debt, then promotional offers for balance transfers and/or refinancing may be presented. Any of numerous types of feedback which encourage positive financial behavior and/or provide tools to achieve the lifestyle the user wants without jeopardizing her long-term financial wellness may be provided.

Some embodiments of the invention may also provide for assessing the pace of different types of month-to-date financial activity in relation to the pace of activity during comparable month-to-date periods. For example, a comparison between the current and typical month-to-date spending may give the user a sense whether she should reduce her spending to stay within her monthly budget. Similarly, a comparison between current and typical month-to-date saving may give the user a sense whether she is on track to achieve savings goals for the current month.

Figure 6:
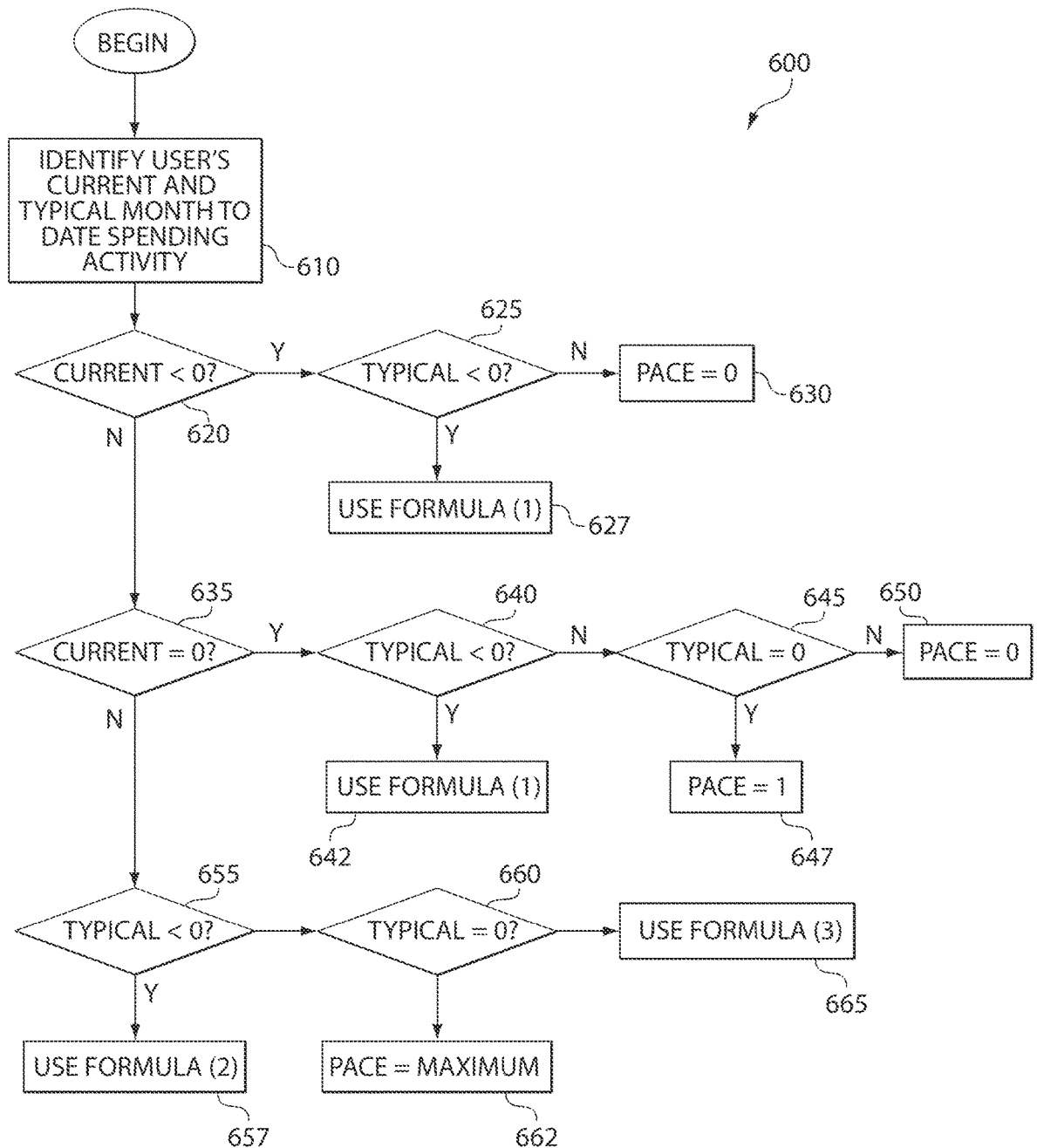
FIG. 6 is a flowchart depicting a representative process for assessing the pace of a user's spending activity, in accordance with some embodiments of the invention.
Figure 7:
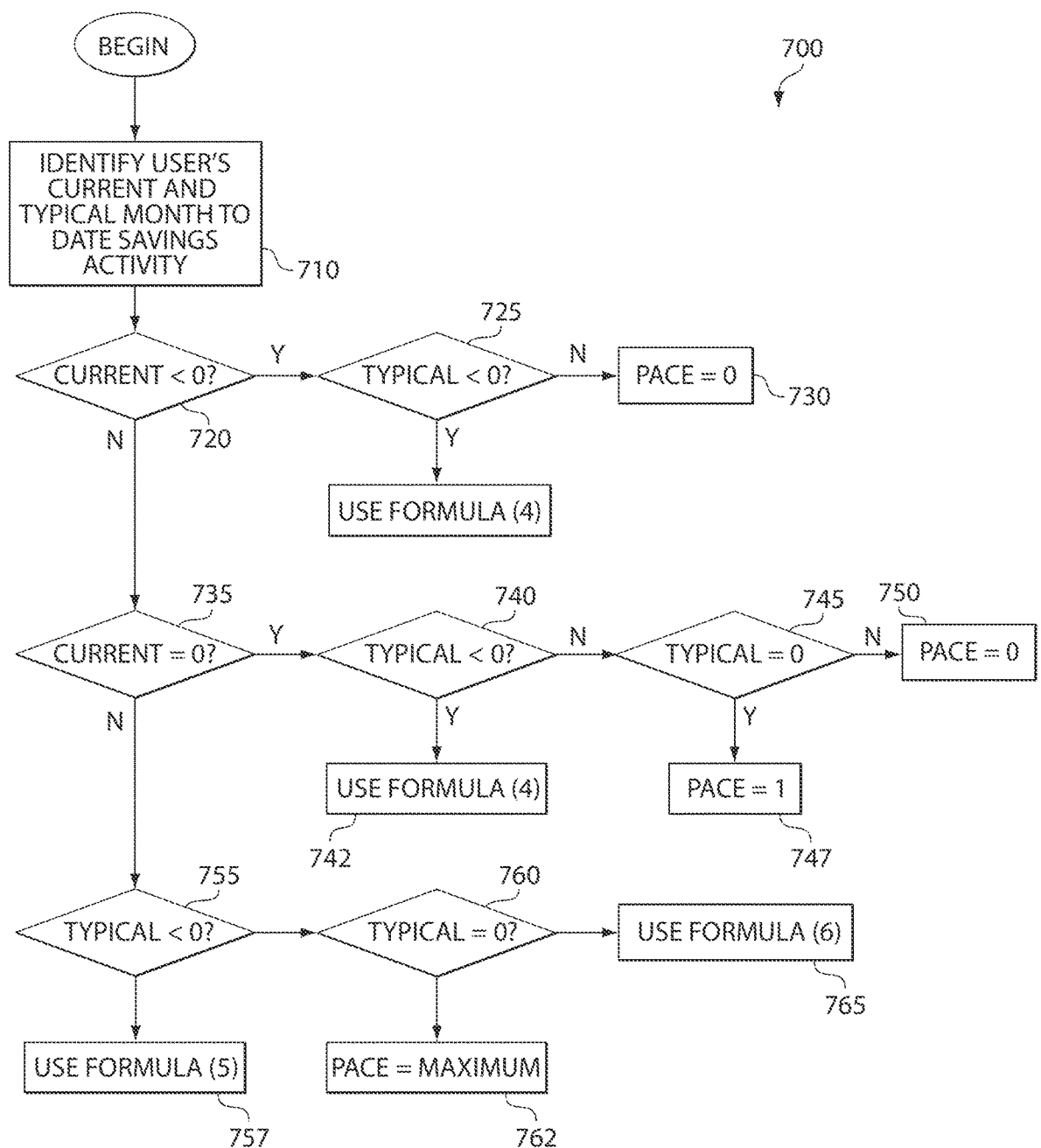
FIG. 7 is a flowchart depicting a representative process for assessing the pace of a user's savings activity, in accordance with some embodiments of the invention.

A representative process 600 for assessing the pace of a user's spending activity is shown in FIG. 6, and a representative process 700 for assessing the pace of a user's saving activity is shown in FIG. 7. Referring initially to FIG. 6, at the start of representative process 600, the user's current and typical month-to-date financial activity in the "spend" and "live" categories in the "money out" super-category (Table 1) is determined in act 610. Of course, in other embodiments, transactions in different super-categories, categories and/or sub-categories may be used to determine the user's spending activity.

Determination of the user's current month-to-date financial activity may be determined much like as in act 320 of process 300, wherein transactions within each of the "spend" and "live" categories from the first day of the current calendar month through the current day of the calendar month are summed. Similarly, typical month-to-date financial activity may be determined much like as in act 330, wherein the period(s) to be used for comparison are identified (e.g., using the techniques described above), the transactions for each of the "spend" and "live" categories which occurred within the identified period(s) are summed, and then the average of the summed totals are calculated to determine the typical month-to-date activity for each category.

Process 600 then proceeds to act 620, wherein a determination is made whether the current month-to-date financial activity for one of the categories given above (e.g., the "spend" category) is less than zero. If so, process 600 proceeds to act 625, wherein a determination is made whether the typical month-to-date activity for the category is less than zero. If so, the pace of the user's current month-to-date activity in the category relative to her typical month-to-date activity in the category is calculated in act 627 using formula (1), below:

$$\text{Pace}=1-((\text{Current month-to-date activity})/(\text{Typical month-to-date activity})) \quad (1)$$

If it is determined in act 625 that the typical month-to-date financial activity for the category is not less than zero, then process 600 proceeds to act 630. At this point, the user's typical month-to-date activity for the category has been established as being greater than or equal to zero (since it was determined to not be less than zero in act 625). Given this, in act 630 the pace of the user's current month-to-date activity in the category relative to her typical month-to-date activity in the category is set as zero.

If it was determined in act 620 that the current month-to-date financial activity for the category is not less than or equal to zero, then process 600 proceeds to act 635, wherein a determination is made whether the current month-to-date financial activity for the category is equal to zero. If so, process 600 proceeds to act 640, wherein a determination is made whether the typical month-to-date activity for the category is less than zero. If so, the pace of the user's current month-to-date activity in the category relative to her typical month-to-date activity is calculated using formula (1), above.

If it is determined in act 640 that the typical month-to-date activity for the category is not less than zero, then process 600 proceeds to act 645, wherein a determination is made whether the typical month-to-date activity for the category is equal to zero. If so, the pace of the user's current month-to-date activity in the category relative to her typical month-to-date activity is defined as 1.

If it is determined in act 645 that the typical month-to-date activity for the category is not equal to zero, then it is known that the user's typical month-to-date activity for the category is greater than zero (since it was determined in act 640 not to be less than zero, and in act 645 to not be equal to zero). Given this, the pace of the user's current month-to-date activity in the category relative to her typical month-to-date activity is set in act 650 as 0.

If it was determined in act 635 that the current month-to-date financial activity for the category is not equal to zero, then it is known that the current month-to-date financial activity for the category must be greater than zero (since it was determined to not be less than zero in act 620, and not equal to zero in act 635). Process 600 proceeds to act 655, wherein a determination is made whether the typical month-to-date activity for the category is less than zero. If so, the pace of the user's current month-to-date activity in the category relative to her typical month-to-date activity in the category is calculated in act 657 using formula (2), below:

Pace=((Current month-to-date activity)−(Typical month-to-date activity))/|(Current month-to-date activity)|    (2)

If it is determined in act 655 that the typical month-to-date financial activity for the category is not less than zero, then the process proceeds to act 660, wherein a determination is made whether the typical month-to-date activity for the category is equal to zero. If so, the pace of the user's current month-to-date activity in the category relative to her typical month-to-date activity in the category is defined in act as a maximum pace.

If it is determined in act 660 that the typical month-to-date financial activity for the category is not equal to zero, then the typical month-to-date activity for the category is known to be greater than zero (since it was determined to not be less than zero in act 655, and not equal to zero in act 660), and the pace of the user's current month-to-date activity in the category relative to her typical month-to-date activity in the category is calculated in act 665 using formula (3), below:

Pace=(Current month-to-date activity)/(Typical month-to-date activity)    (3)

Process 600 then completes for the selected category. It may be repeated for another category (e.g., for the "live" category, if the steps described above were performed for the "spend" category), if necessary.

Representative process 700, for assessing the pace of a user's saving activity, is shown in FIG. 7. At the start of process 700, the user's current and typical month-to-date savings activity are determined in act 710. As with act 610 described above, this may be performed in any one of several ways. For example, current month-to-date savings activity may be determined in much the same way as in act 420 of process 400, wherein savings transactions from the first day of the current calendar month through the current day of the calendar month are summed. Similarly, typical month-to-date savings activity may be determined in much the same ways as in act 430, wherein the period(s) to be used for comparison are identified, the savings transactions which occurred within the identified period(s) are summed, and the average of the summed totals are calculated to determine the typical month-to-date savings activity.

Process 700 then proceeds to act 720, wherein a determination is made whether the current month-to-date savings activity is less than zero. If so, process 700 proceeds to act 725, wherein a determination is made whether the typical month-to-date savings activity is less than zero. If so, the pace of the user's current month-to-date activity in the category relative to her typical month-to-date activity in the category is calculated using formula (4), below:

Pace=1+(((Current month-to-date activity)−(Typical month-to-date activity))/|(Current month-to-date activity))    (4)

If it is determined in act 725 that the typical month-to-date savings activity is not less than zero, then process 700 proceeds to act 730. At this point, the user's typical month-to-date activity for the category is known to be greater than or equal to zero (since it was determined to not be less than zero in act 725). Given this, the pace of the user's current month-to-date savings activity relative to her typical month-to-date savings activity is set in act 730 as zero.

If it was determined in act 720 that the current month-to-date financial activity for the category is not less than or equal to zero, then process 700 proceeds to act 735, wherein a determination is made whether the current month-to-date savings activity is equal to zero. If so, process 700 proceeds to act 740, wherein a determination is made whether the typical month-to-date savings activity is less than zero. If so, the pace of the user's current month-to-date savings activity relative to her typical month-to-date savings activity is calculated using formula (4), above.

If it is determined in act 740 that the typical month-to-date savings activity is not less than zero, then process 700 proceeds to act 745, wherein a determination is made whether the typical month-to-date savings activity is equal to zero. If so, the pace of the user's current month-to-date savings activity relative to her typical month-to-date savings activity is set in act 747 as 1.

If it is determined in act 745 that the typical month-to-date savings activity is not equal to zero, then process 700 proceeds to act 750. At this point, the user's typical month-to-date savings activity is known to be greater than zero (since it was determined in act 740 to not be less than zero, and in act 745 to not be equal to zero). Given this, the pace of the user's current month-to-date savings activity relative to her typical month-to-date savings activity is defined as 0.

If it was determined in act 735 that the current month-to-date savings activity is not equal to zero, then it is known that the current month-to-date savings activity must be greater than zero (since it was determined to not be less than zero in act 720, and not equal to zero in act 735). Process 700 proceeds to act 755, wherein a determination is made whether the typical month-to-date savings activity is less than zero. If so, the pace of the user's current month-to-date savings activity relative to her typical month-to-date savings activity is calculated using formula (5), below:

$$\text{Pace} = ((\text{Current month-to-date activity}) - (\text{Typical month-to-date activity})) / |(\text{Current month-to-date activity})| \quad (5)$$

If it is determined in act 755 that the typical month-to-date savings activity is not less than zero, then the process proceeds to act 760, wherein a determination is made whether the typical month-to-date savings activity is equal to zero. If so, the pace of the user's current month-to-date savings activity is defined in act 762 as being at a maximum pace relative to her typical month-to-date savings activity.

If it is determined in act 760 that the typical month-to-date savings activity is not equal to zero, then the process proceeds to act 765. Given that the typical month-to-date savings activity is greater than zero (since it was determined to not be less than zero in act 755, and not equal to zero in act 760), the pace of the user's current month-to-date savings activity relative to her typical month-to-date savings activity is calculated in act 765 using formula (7), below:

$$\text{Pace} = (\text{Current month-to-date activity}) / (\text{Typical month-to-date activity}) \quad (6)$$

Process 700 then completes.

The results produced by performing representative processes 600 and 700 may be used in any one of numerous ways. In some embodiments of the invention, the pace of the user's spending or savings activity may be depicted graphically, so as to provide the user with an easy-to-understand representation of how her current spending or saving pace compares with her typical pace. For example, in some embodiments, a tachometer-like representation may be shown to the user. For spending activity pace, a "green" reading may indicate that the user's current spending pace is reasonable relative to her typical spending pace, a "yellow" reading may indicate that her current spending pace is near or slightly above her typical spending pace, indicating that she may wish to "slow down" to stay within budgeted levels, and a "red" reading may indicate that her current spending pace exceeds her typical spending pace, indicating that she may want to "stop" before far exceeding her budgeted spending levels. Conversely, for savings activity pace, a "green" reading may indicate that the user's current savings pace is reasonable relative to her typical savings pace, a "yellow" reading may indicate that her current spending pace is at or slightly below her typical pace, indicating that she may want to "speed up" her savings rate to meet her monthly goals, and a "red" reading may indicate that her current savings pace is well below her typical pace.

Figure 8:
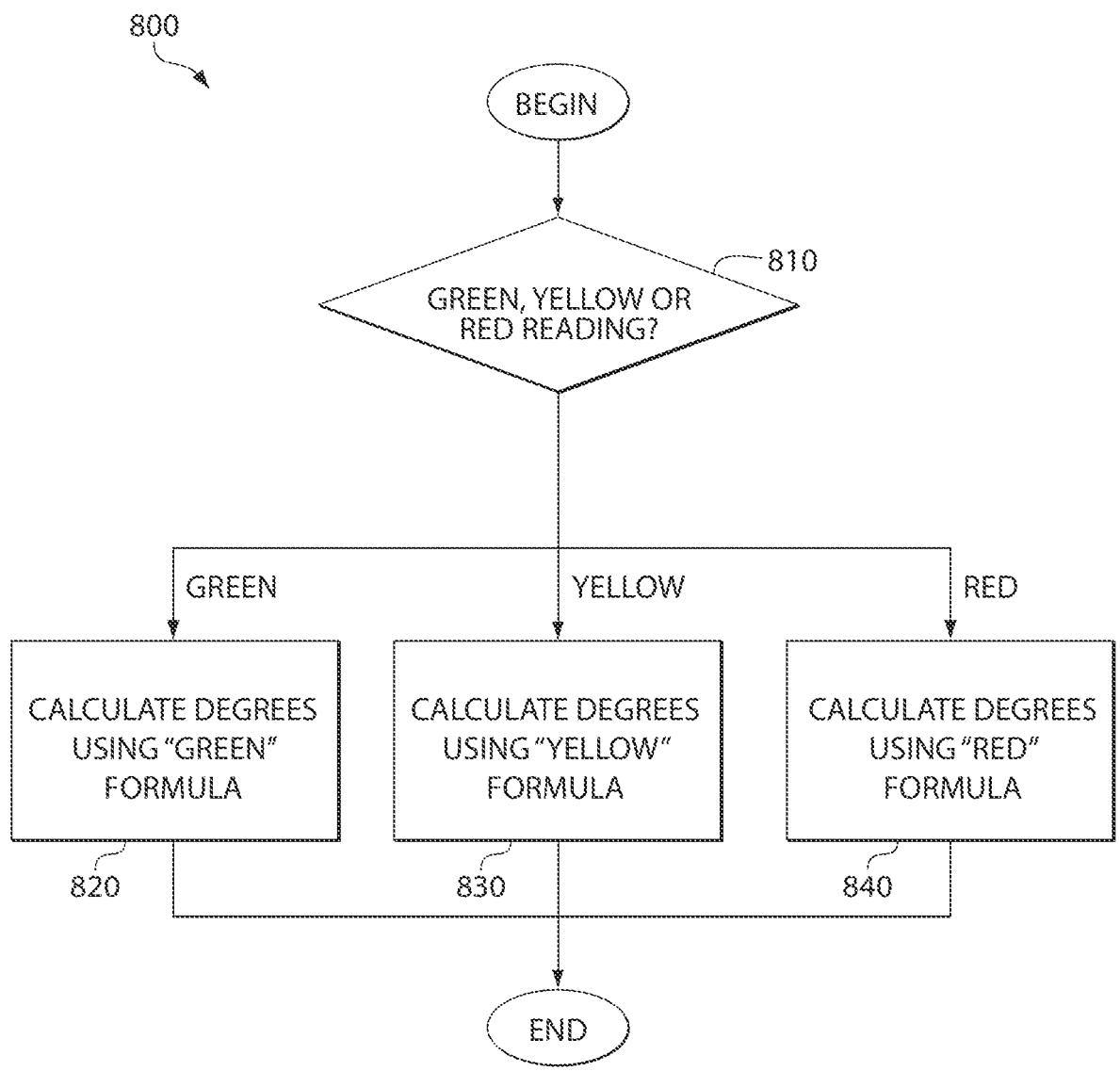
FIG. 8 is a flowchart of a representative process for generating a representation of a user's pace of spending activity, in accordance with some embodiments of the invention.

FIG. 8 shows a representative process 800 which may be performed to determine where on a tachometer encompassing an overall range of 270 degrees the "needle" should be placed to represent the user's current spending pace relative to her typical spending pace. In this example, the "green" reading upper bound is set at 150 degrees on the tachometer, the "yellow" reading upper bound is set at 190 degrees, and the "red" reading upper bound is set at 270 degrees.

In act 810, a determination is made whether the result of process 600 (i.e., the user's relative spending pace) is associated with a "green," "yellow" or "red" reading. In this example, a result of 0.0 through 0.9 is associated with a "green" reading (so that the "green" reading encompasses a range of 0.9), a result of greater than 0.9 and less than 1.1 is associated with a "yellow" reading (so that the "yellow" reading encompasses a range of 0.2), and a result of greater than 1.1 and less than 1.5 is associated with a "red" reading (so that the "red" reading encompasses a range of 0.4). However, it should be appreciated that any suitable numerical range may be associated with any readings.

If it is determined in act 810 that the result is associated with a "green" reading, then process 800 proceeds to act 820, wherein the number of degrees at which the tachometer needle resides is calculated as follows:
 (a) divide the result of process 600 by the range encompassed by the "green" reading;
 (b) multiply the result of (a) by the number of degrees at the upper bound of the "green" reading; and
 (c) round the result of (c) to the nearest multiple of ten.

For example, if the result of process 600 is 0.75, then the number of degrees at which the tachometer needle should reside is (0.75/0.9×150=125, rounded to the nearest multiple of ten=130). Thus, in this example, the result of process 600 of 0.75 would yield a tachometer needle at 130 degrees.

If it is determined in act 810 that the result is associated with a "yellow" reading, then process 800 proceeds to act 830, wherein the number of degrees at which the tachometer needle resides is calculated as follows:
 (a) subtract the range encompassed by the "green" reading from the result of process 600;
 (b) divide the result of (a) by the range encompassed by the "yellow" reading;
 (c) multiply the result of (b) by the difference between the number of degrees at the upper bound of the "green" reading and the number of degrees at the upper bound of the "yellow" reading; and
 (d) add to the result of (c) the number of degrees at the upper bound of the "green" reading; and
 (e) round the result to the nearest multiple of ten.

For example, if the result of process 600 is 1.05, then the number of degrees at which the tachometer needle sits is ((1.05−0.9)/0.2×40)+150=160, rounded to the nearest multiple of ten=160. Thus, in this example, the result of process 600 of 1.05 would yield a tachometer needle residing at 150 degrees.

If it is determined in act 810 that the result is associated with a "red" reading, then process 800 proceeds to act 840, wherein the number of degrees at which the tachometer needle sits is calculated as follows:
 (a) subtract the range encompassed by the "yellow" reading from the result of process 600;
 (b) divide the result of (a) by the difference between the range encompassed by the "red" reading and the range encompassed by the "yellow" reading;
 (c) multiply the result of (b) by the difference between the "red" range upper bound and the "yellow" range upper bound;
 (d) add to the result of (c) the number of degrees at the upper bound of the "yellow" reading; and
 (e) round the result of (d) to the nearest multiple of ten.

For example, if the result of process 600 is 1.2, then the number of degrees at which the tachometer sits is ((1.2−1.1)/0.4×40)+190=200, rounded to the nearest multiple of ten=200. Thus, in this example, the result of process 600 of 1.2 would yield a tachometer needle residing at 200 degrees.

At the completion of act 820, 830 or 840, process 800 completes.

Figure 9:
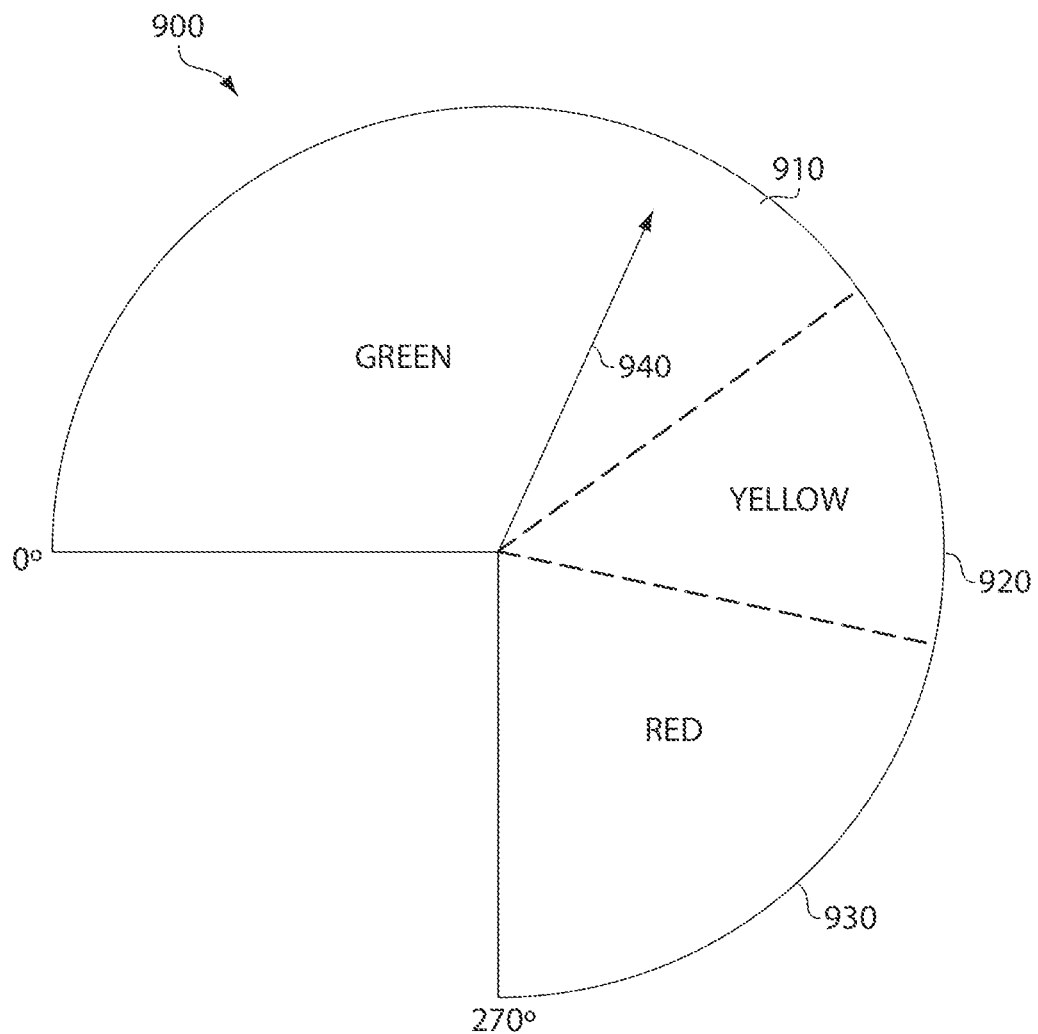
FIG. 9 is a chart depicting a user's pace of spending activity, in accordance with some embodiments of the invention.

An illustration representing a comparison between a user's current spending pace relative to her typical spending pace is shown in FIG. 9. In general, the illustration resembles a tachometer, and may indicate to the user whether her current pace of spending puts her in "green" area 910, "yellow" area 920 or "red" area 930 relative to her typical spending pace. In the example shown, "green" area 910 extends from 0° on the tachometer to 150°, the "yellow" area extends from 150° to 190°, and the "red" area 930 extends from 190° to 270°. Needle 940 is placed at a number of degrees calculated above in the process of FIG. 8. Specifically, in the example shown, needle 940 resides in the "green" area 910, indicating that the number of degrees to which the head of needle 940 points is calculated in act 820 of process 800, indicating that the pace of the user's spending activity in the current month is reasonable relative to her typical spending activity. Had the user's current spending pace been greater than her typical spending pace, the head of needle 940 might have pointed toward a location in the "yellow" or "red" area.

Figure 10:
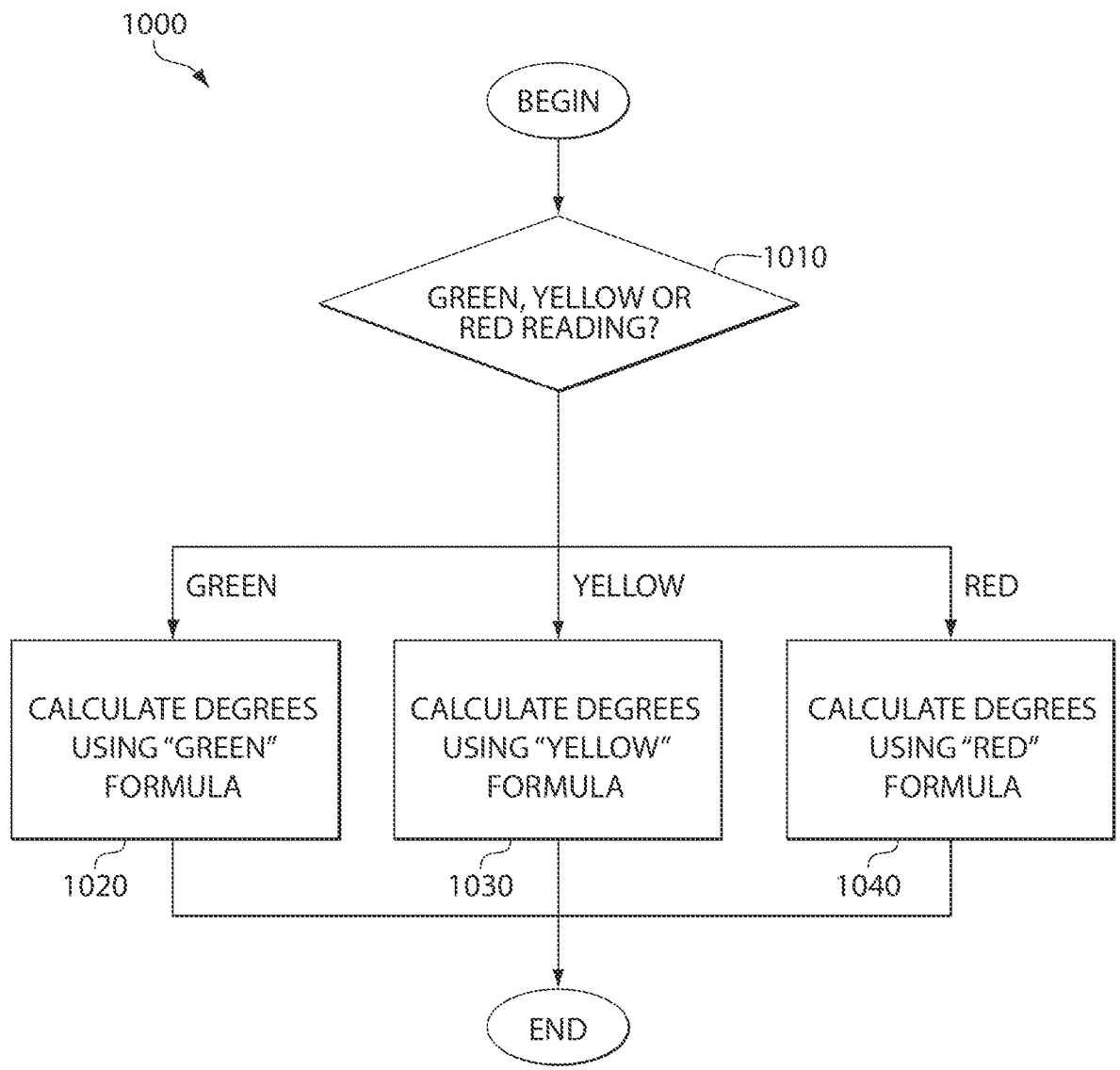
FIG. 10 is a flowchart of a representative process for generating a representation of a user's pace of savings activity, in accordance with some embodiments of the invention.

FIG. 10 shows a representative process 1000 which may be performed to determine where on a tachometer encompassing an overall range of 270 degrees the "needle" should reside to represent the user's current savings pace relative to her typical savings pace. In this example, the "red" reading upper bound is set at 90 degrees on the tachometer, the "yellow" reading upper bound is set at 130 degrees, and the "green" reading upper bound is set at 270 degrees.

In act 1010, a determination is made whether the result of process 700 (i.e., the user's relative pace of savings activity) is associated with a "green," "yellow" or "red" reading. In this example, a result of 0.0 through 0.75 is associated with a "red" reading (so that the "red" reading encompasses a range of 0.75), a result of greater than 0.75 and less than 0.95 is associated with a "yellow" reading (so that the "yellow" reading encompasses a range of 0.2), and a result of greater than 0.95 and less than 1.5 is associated with a "green" reading (so that the "green" reading encompasses a range of 0.55). However, it should be appreciated that any suitable numerical range may be associated with any associated reading.

If it is determined in act 1010 that the result is associated with a "red" reading, then process 1000 proceeds to act 1020, wherein the number of degrees at which the tachometer needle resides is calculated as follows:
 (a) divide the result of process 700 by the range encompassed by the "red" reading;
 (b) multiply the result of (a) by 90; and
 (c) round the result of (b) to two significant digits.

For example, if the result of process 700 is 0.5, then the number of degrees at which the tachometer needle should reside is (0.5/0.75×90=60, rounded to two significant digits=60). Thus, in this example, the result of process 700 of 0.5 would yield a tachometer needle at 60 degrees.

If it is determined in act 1010 that the result is associated with a "yellow" reading, then process 1000 proceeds to act 1030, wherein the number of degrees at which the tachometer needle resides is calculated as follows:
 (a) subtract 0.75 from the result of process 700;
 (b) divide the result of (a) by the range encompassed by the "yellow" reading;
 (c) multiply the result of (b) by the difference between the number of degrees at the upper bound of the "yellow" reading and the number of degrees at the upper bound of the "red" reading; and
 (d) add 90 to the result of (c); and
 (e) round the result to two significant digits.

For example, if the result of process 700 is 0.9, then the number of degrees at which the tachometer needle sits is ((0.9−0.75)/0.2×30)+90=110, rounded to two significant digits=110. Thus, in this example, the result of process 700 of 0.9 would yield a tachometer needle residing at 110 degrees.

If it is determined in act 1010 that the result is associated with a "green" reading, then process 1000 proceeds to act 1040, wherein the number of degrees at which the tachometer needle sits is calculated as follows:
 (a) determine the minimum of
  (i) the difference between the upper bound of the "green" range and the upper bound of the "yellow" range;
  (ii) the difference between the result of process 700 and the upper bound of the "yellow" range;
 (b) divide the result of (a) by the difference between the range encompassed by the "green" reading and the range encompassed by the "yellow" reading;
 (c) multiply the result of (b) by the difference between the "green" range upper bound and the "yellow" range upper bound;
 (d) add to the result of (c) the number of degrees at the upper bound of the "yellow" reading; and
 (e) round the result of (d) to two significant digits.

For example, if the result of process 700 is 1.2, then the result of (a) is 0.25 (i.e., 1.2−0.95, which is less than 1.5−0.95), and the number of degrees at which the tachometer sits is ((1.2−0.95)/0.4×140)+130, rounded to the nearest multiple of ten=220. Thus, in this example, the result of process 700 of 1.2 would yield a tachometer needle residing at 220 degrees.

At the completion of act 1020, 1030 or 1040, process 1000 completes.

Figure 11:
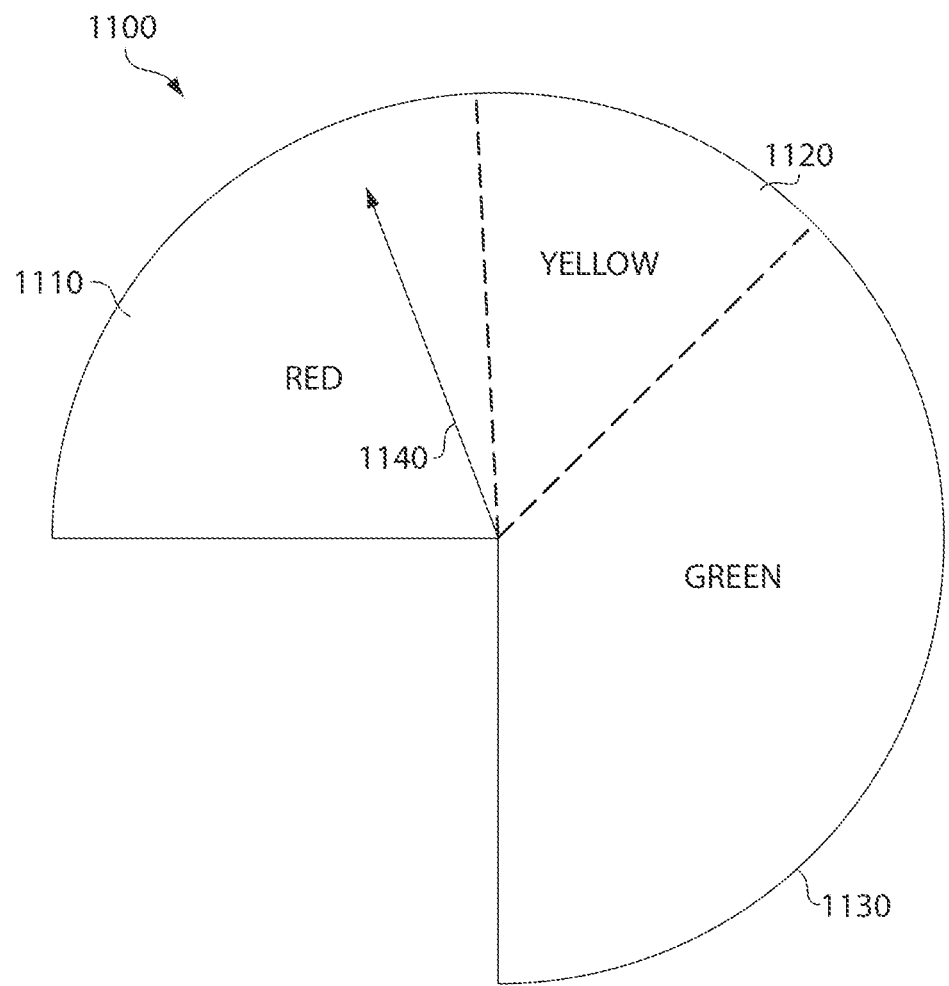
FIG. 11 is a chart depicting a user's pace of savings activity, in accordance with some embodiments of the invention.

FIG. 11 depicts an illustration which represents a user's current savings pace relative to her typical savings pace. Like the illustration shown in FIG. 9, FIG. 11 resembles a tachometer which indicates the user's savings pace through the placement of needle 1140 in "red" area 1110, "yellow" area 1120, or "green" area 1130. In this example, needle 1140 sits in the "red" area 1110, indicating that the user's current pace of savings is slower than her typical pace of savings pace, which may indicate to the user that she should increase her savings to stay on track to achieve her savings goals.

III. High-Level Interaction

Some embodiments of the invention may provide a user with an indication of her overall financial well-being, such as in the form of a score. Such a score may, for example, reflect the user's ability to sustain savings levels and/or increase her net worth over time. Providing the user an indication of her overall financial well-being may encourage her to behave in ways that promote her financial well-being. In addition, some embodiments of the invention may enable users to earn "points" and/or other indicia as a result of attaining a particular financial wellness score. The user may, for example, redeem the points/other indicia for rewards, discounts, etc., which contribute to financial wellness. As such, by engaging in positive financial behavior, the user may receive rewards which further bolster her financial well-being, which may in turn lead to increases in her financial wellness score. A virtuous financial cycle may therefore be initiated, and continue over time.

A financial wellness score may be calculated in any one of numerous ways. In some embodiments of the invention, a financial wellness score is defined on a 100-point scale, with forty points being awarded as a result of providing baseline profile information and interacting with the service, and sixty points being awarded as a result of engaging in positive financial behavior. Of course, any suitable scale may be used, which may apportion points contributing to an overall score in any suitable way.

A representative baseline data scoring scheme is illustrated below. In this example, a user is awarded a maximum of thirty points for providing the information specified in Table 5, and a maximum of ten points for providing information on social networks to which the user belongs and interacting with the service in Table 6. Of course, other schemes are possible. Alternative schemes may involve awarding more or less than forty points total for baseline data, may include criteria for awarding points which are different than those listed below, and/or may award a different number of points for each criterion.

TABLE 5

User Information

| Customer Profile | Required | Points | Notes |
|---|---|---|---|
| First Name | ✓ | 2.5 | |
| Last Name | ✓ | 2.5 | |
| Address | ✓ | 5.0 | Check Against USPS Valid Addresses |
| Apt Number | | | |
| City | | | Valid US City Name (Searchable Drop Down List) |
| State | | | State Drop Down List |
| Zip Code | ✓ | 5.0 | Valid US ZIP Code |
| Date of Birth | ✓ | 5.0 | Valid Birth Date Format |
| Gender | ✓ | | Male/Female |
| Household Status | ✓ | | Single, Couple, Single with Kids, Couple with Kids |
| Email Address | ✓ | 5.0 | Valid E-mail Format |
| Phone Number | ✓ | 5.0 | Valid US Phone Number Format |
| Social Security Number | Bank Only | | Valid US SSN Number Format |
| Total | | 30 | |

TABLE 6

Social Network Information; Level of Interaction.

| Customer Profile | Required | Points | Notes |
|---|---|---|---|
| Facebook Network | | 0.5 | |
| Twitter Network | | 0.5 | |
| LinkedIn Network | | 0.5 | |
| Klout/Peerindex Influence | | 0.5 | |
| Moven Tweets/Mentions/Likes | | 2.0 | |
| Account Referrals | | 3.0 | |
| Unique P2P Transfers | | 3.0 | |
| Total | | 10 | |

As Table 6 illustrates, a baseline data scoring scheme may reward a user for her involvement in social networks, for her regular engagement with the service, and for making her connections on the social networks aware of that engagement. For example, a user may be rewarded for mentioning her use of the service in social network-based announcements (e.g., "status updates," "tweets" and/or other types of announcements), referral of the service to social network connections, and/or performing transfers (e.g., of funds, points, etc.) to social network connections.

A representative financial behavior scoring scheme is shown below. In this example, a user is awarded a maximum of sixty points for engaging in positive behaviors termed "living within means," "emergency fund," "disciplined savings," and "expense management." Representative techniques for determining the score that is awarded to a user for each of these categories are described below. As with the scheme given above for awarding points for baseline data, other schemes are possible, and may involve awarding more or less than sixty points total, may include criteria for awarding points which are different than those listed below, and/or may award a different number of points for each criterion.

TABLE 7

Positive Financial Behavior.

| Financial Health | Points | Notes |
|---|---|---|
| Credit Score | | FICO |
| Debt Load | | Total Debt |
| Debt Servicing | | Monthly Payments |
| Living within Means | 15 | Expenses to Income |
| Emergency Fund | 15 | Savings Balance Information |
| Disciplined Savings | 15 | Savings Rate |
| Expense Management | 15 | Spend Volatility |
| Total | 60 | |

Figure 12:
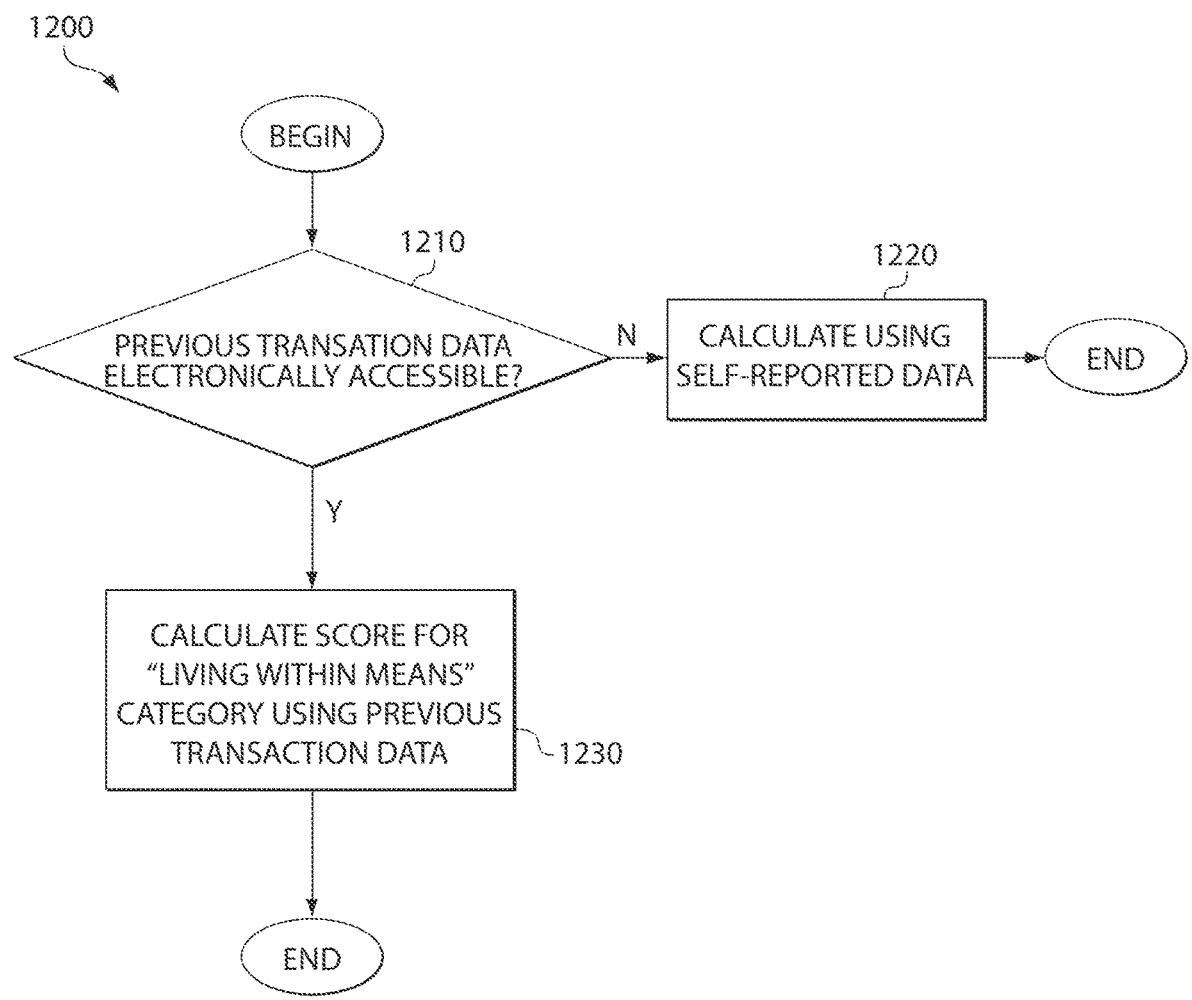
FIG. 12 is a flowchart of a representative process for determining a category score in relation to an overall financial wellness score, in accordance with some embodiments of the invention.

A representative process 1200 for calculating a number of points to be awarded to a user for the "living within means" category is shown in FIG. 12. At the start of process 1200, a determination is made in act 1210 whether previous transaction data for the user is electronically accessible. For example, if the user has not provided access to her financial accounts, then previous transaction data may be inaccessible. If it is determined in act 1210 that previous transaction data for the user is not electronically accessible, then process 1200 proceeds to act 1220, wherein a score for the category is calculated based on information, related to living within one's means, which is reported by the user. Table 8 shows representative information which may be collected from the user, and a representative scheme for awarding points to each piece of information.

TABLE 8

Scoring of Self-Reported Information For "Living Within Means" Category.

| Information | Points | | | Notes | | |
|---|---|---|---|---|---|---|
| What is your current monthly take home pay? | | | | | | |
| Do you spend less than this amount each month? | 5 | 3 | 0 | Always | Sometimes | Never |
| Do you ever make impulsive purchases? | 5 | 3 | 0 | Never | Sometimes | Always |
| Ever spend more than your credit limit or not pay your credit card balance in full each month? | 5 | 3 | 0 | Never | Sometimes | Always |
| Total | 15 | | | | | |

If it is determined in act 1210 that previous transaction data for the user is electronically accessible, then process 1200 proceeds to act 1230, wherein a score for the category is calculated based on that data. Specifically, act 1230 may involve calculating a "living with means" ratio, as follows:

(a) for each month after the first month having complete income transaction data (e.g., having at least 2 income transactions separated by at least 14 days), calculate the sum of all income transactions;

(b) calculate the average of the 3 most recent months from the result of (a);

(c) for each month represented in the result of (b), calculate the total monthly expenses (e.g., the sum of transactions in the "spend," "live," "give" and "taxes" categories) for the month;

(d) for each day of each month represented in the result of (b), calculate the total daily expenses (e.g., the sum of transactions in the "spend," "live," "give" and "taxes" categories);

(e) calculate the average monthly expenses by taking the average of the results in (c);

(f) calculate the average daily expenses by taking the average of the results in (d);

(g) calculate the average monthly remaining income by subtracting the average monthly expenses generated in (e) from the average monthly income generated in (b);

(h) calculate the "delta" between the average daily expenses and the total daily expenses, by subtracting the total daily expenses generated in (d) from the average daily expenses generated in (f);

(i) calculate the average daily remaining income for each month by adding the average monthly remaining income calculated in (g) and the delta calculated in (h);

(j) calculate the expense-to-income ratio by dividing the average daily remaining income calculated in (i) by the average income calculated in (b);

(k) if the expense-to-income ratio calculated in (j) is less than or equal to zero, then add zero points to the financial wellness score;

(l) if the expense-to-income ratio calculated in (j) is greater than 0.1, then add fifteen points to the financial wellness score; and (m) if the expense-to-income ratio calculated in (j) is greater than zero but less than or equal to 0.1, then multiply the expense-to-income ratio calculated in (j) by 150, and add the result to the financial wellness score.

At the completion of act 1230, process 1200 ends.

Figure 13:
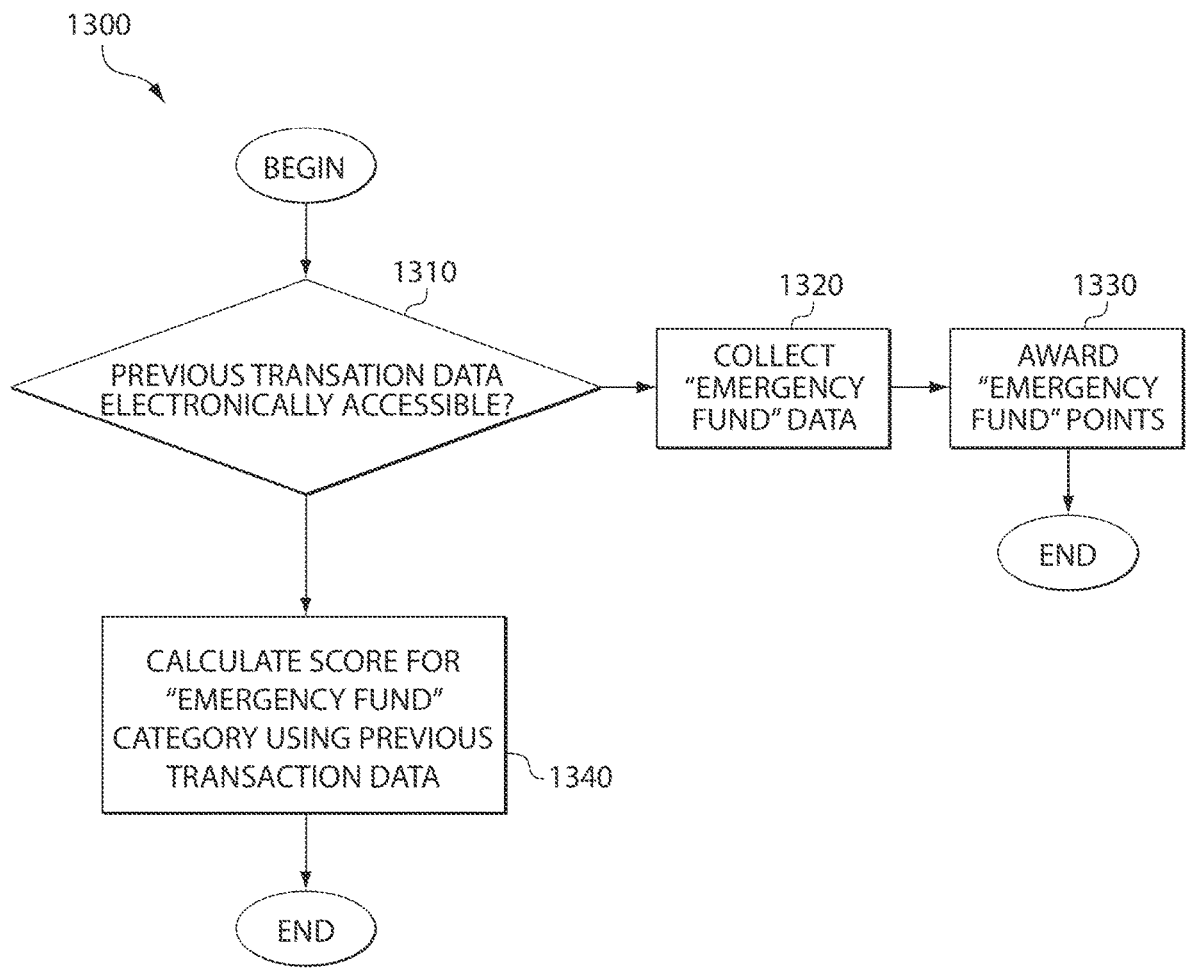
FIG. 13 is a flowchart of a representative process for calculating a category score which relates to an overall financial wellness score, in accordance with some embodiments of the invention.

A representative process 1300 for calculating a number of points to be awarded to a user for the "emergency fund" category is shown in FIG. 13. At the start of process 1300, a determination is made in act 1310 whether previous transaction data for the user is electronically accessible. If not, process 1300 proceeds to act 1320, wherein emergency fund information is collected from the user. Table 9 shows representative information which may be collected.

TABLE 9

Scoring of Self-Reported Information For "Emergency Fund" Category.

| Information | Data | Notes |
|---|---|---|
| What is your current monthly take home pay? | | Exact Dollar Field |
| How much cash do you have in savings? | | Exact Dollar Field |

Process 1300 then proceeds to act 1330, wherein the ratio of the user's self-reported emergency fund to the user's self-reported monthly take home pay, and a number of "emergency fund" points to be awarded as a result, are calculated. Specifically, act 1230 involves awarding "emergency fund" points as follows:

(a) if the ratio of emergency fund to monthly take home pay is zero, add zero points to the financial wellness score;

(b) if the ratio of emergency fund to monthly take home pay is greater than six, add fifteen points to the financial wellness score; and (c) if the ratio of emergency fund to monthly take home pay is greater than zero and less than or equal to six, multiply the ration by 2.5, and add the result to the financial wellness score.

If it is determined in act 1310 that previous transaction data for the user is electronically accessible, then process 1300 proceeds to act 1340, wherein a score for the "emergency fund" category is calculated based on that data. Specifically, in act 1340, a score may be calculated as follows:

(a) determine the user's total cash by calculating the sum of the amounts in her checking account(s), savings account(s) and money market account(s);

(b) calculate the user's emergency fund by subtracting from the user's total cash calculated in (a) the sum of the average monthly expenses calculated in step (e) of act 1230, and the user's total daily expenses calculated in step (d) of act 1230;

(c) determine the emergency fund multiplier by dividing the user's emergency fund calculated in (b) by the sum of the average monthly expenses calculated in step (e) of act 1230;

(d) if the emergency fund multiplier is equal to zero, add zero points to the financial wellness score;

(e) if the emergency fund multiplier is greater than six, add fifteen points to the financial wellness score; and (f) if the emergency fund multiplier is greater than zero and less than or equal to six, calculate the product of the emergency fund multiplier and 2.5, and add the result to the financial wellness score.

At the completion of act 1340, process 1300 ends.

Figure 14:
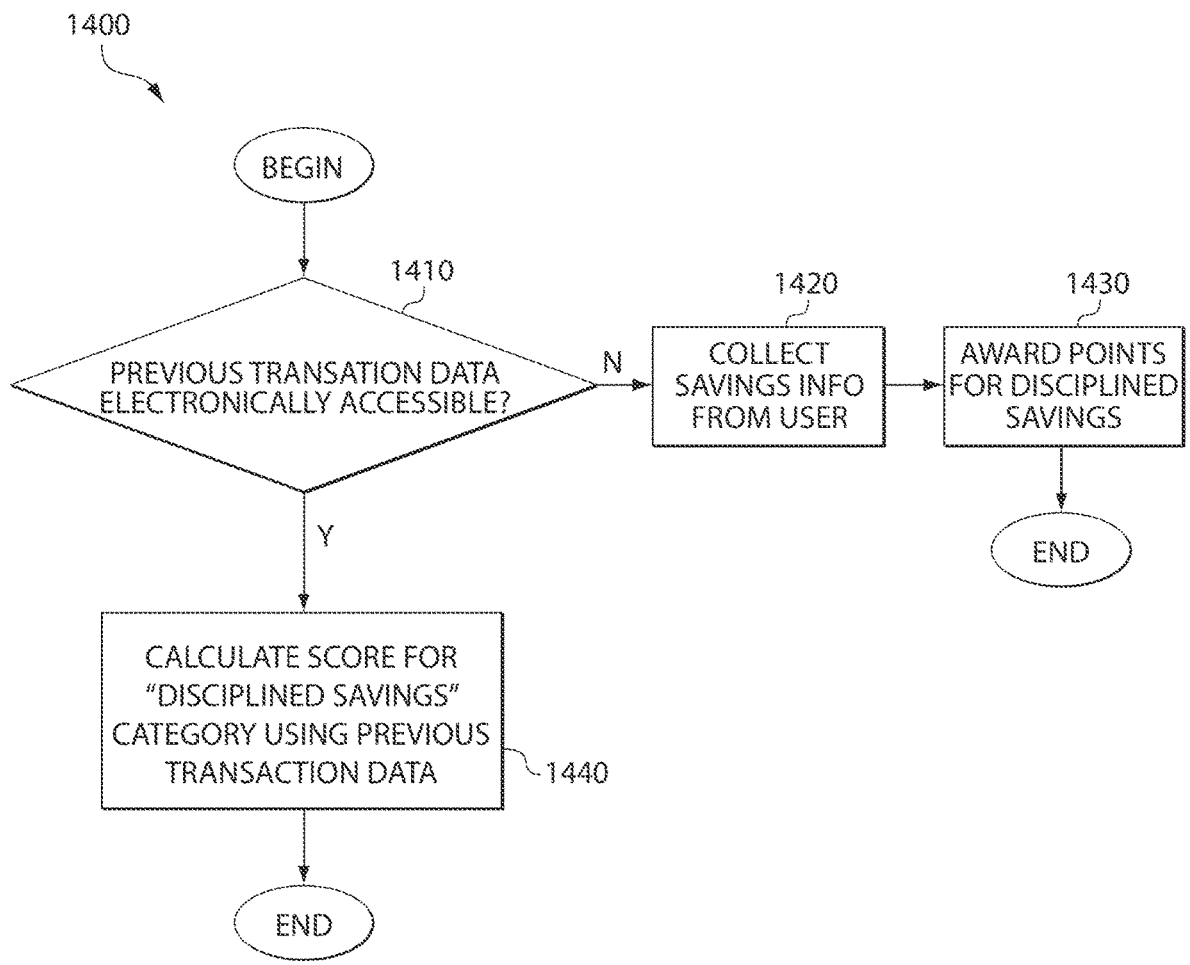
FIG. 14 is flowchart of a representative process for calculating a category score relating to an overall financial wellness score, in accordance with some embodiments of the invention.

A representative process 1400 for calculating a number of points to be awarded to a user for the "disciplined savings" category is shown in FIG. 14. At the start of process 1400, a determination is made in act 1410 whether previous transaction data for the user is electronically accessible. If not, process 1400 proceeds to act 1420, wherein savings information is collected from the user. Table 10 shows representative information which may be collected.

TABLE 10

Self-Reported Information For "Disciplined Savings" Category.

| Information | Data | Notes |
|---|---|---|
| What is your current monthly take home pay? | | Exact Dollar Field |
| Do you set aside money into savings every month? | | Always Sometimes Never |
| How much do you set aside into a savings account each month? | | Exact Dollar Field |

Process 1400 then proceeds to act 1430, wherein a net savings multiplier is calculated, and a number of "disciplined savings" points to be awarded as a result, are calculated. Specifically, act 1230 involves awarding "disciplined savings" points as follows:
  (a) if the user's answer to the question regarding setting aside savings each month is "always," then calculate the net savings multiplier by dividing the amount which the user indicates she sets aside each month by the amount indicated by the user as her monthly take home pay;
  (b) if the user's answer to the question regarding setting aside savings each month is "sometimes," then calculate the net savings multiplier by multiplying the amount the user indicates she sets aside each month by 0.5, and then dividing the result by the amount indicated by the user as her monthly take home pay;
  (c) if the user's answer to the question regarding setting aside savings each month is "never," then set the net savings multiplier to zero;
  (d) if the net savings multiplier is equal to zero, add zero points to the financial wellness score;
  (e) if the net savings multiplier is greater than 0.1, add fifteen points to the financial wellness score; and
  (f) if the net savings multiplier is greater than zero and less than or equal to 0.1, multiply the net savings multiplier by 150, and add the result to the financial wellness score.

If it is determined in act 1410 that previous transaction data for the user is accessible, then process 1400 proceeds to act 1440, wherein a score for the "disciplined savings" category is calculated based on that data. Specifically, in act 1440, a score is calculated as follows:
  (a) determine the new amount saved in each of the past six months;
  (b) determine the average new amount saved per month for the past six months;
  (c) multiply the number of months for which the new amount saved is greater than zero by five;
  (d) determine the standard deviation of the new amount saved over each of the past six months (calculated in (a));
  (e) subtract the average new amount saved per month for the past six months (calculated in (b)) from the new amount saved in the same month (calculated in (a));
  (f) divide the result of the calculation in (e) by the result of the calculation in (d), take the absolute value of the result, and then multiply it by two;
  (g) determine the maximum of:
    (1) five minus the result of the calculation in (f); and
    (2) zero;
  (h) add the result of the calculation in (c) to the result of the calculation in (g), and add the total to the financial wellness score.

At the completion of act 1440, process 1400 ends.

Figure 15:
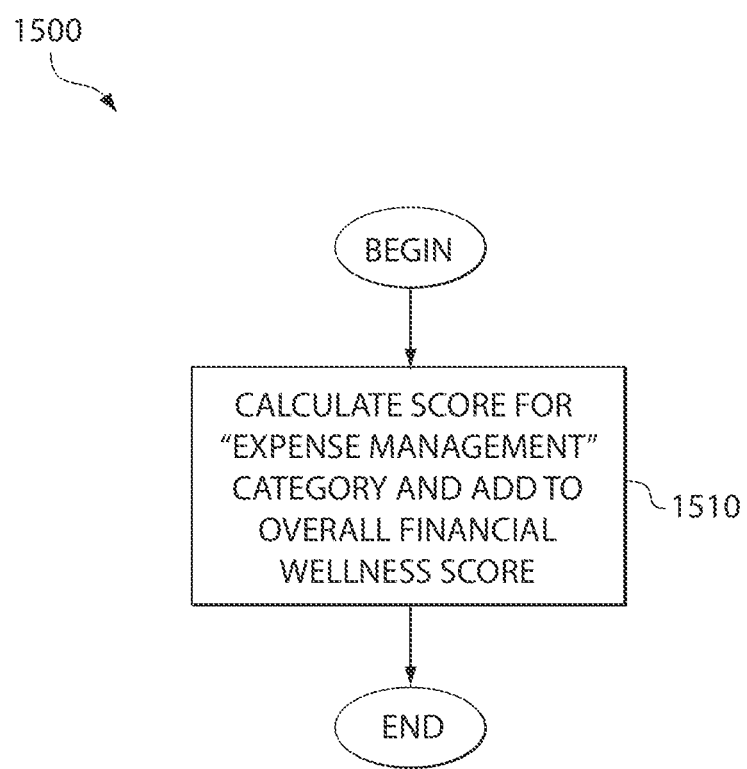
FIG. 15 is a flowchart of a representative process for calculating a category score relating to an overall financial wellness score, in accordance with some embodiments of the invention.

A representative process 1500 for calculating a number of points to be awarded to a user for the "expense management" category is shown in FIG. 15. Process 1500 assumes that previous transaction data for the user is accessible.

At the start of process 1500, in act 1510, a score for the "expense management" category is calculated, and added to the financial wellness score, as follows:
  (a) determine the total daily expense, as indicated by transactions in the "spend," "live" and "give" categories, for each day in the prior six months;
  (b) determine the standard deviation of the total daily expense calculated in (a);
  (c) determine the average of the total daily expense, calculated in (a), for each of the past six months;
  (d) subtract the average total daily expense, calculated in (c), from the total daily expense, calculated in (a);
  (e) divide the result of the calculation in (d) by the standard deviation of the total expense, calculated in (b), and multiply the result by (−1);
  (f) if the result of the calculation in (e) is less than (−1), then add zero points to the financial wellness score;
  (g) if the result of the calculation in (e) is greater than 1, then add ten points to the financial wellness score; and
  (h) if the result of the calculation in (e) is greater than (−1) and less than 1, then add 1 to the result of the calculation in (e), multiply the result by 7.5, and then add the result to the financial wellness score.

At the completion of act 1510, process 1500 ends.

In some embodiments, processes 1220, 1300, 1400 and 1500 may result in points being added to the user's financial wellness score, up to a maximum of sixty points. The combined financial wellness score (e.g., also incorporating the maximum forty points which the user may earn by providing the information listed in Tables 5 and 6) may provide the user with an indication of her overall financial well-being. Being given a consistent indication of her overall financial wellness may encourage her to behave in ways that improve that wellness over time.

In addition, as noted above, rewards may be provided to the user as a result of the user having achieved particular levels of financial well-being. For example, a determination that a user's score is consistently rising may qualify the user for "points" which may be redeemed for goods, services, discounts, and/or other types of consideration. A redemption of points may lead to the user being encouraged to continue her positive financial behavior. For example, if the user redeems points for a discount on an item that she planned to purchase anyway, the user may be encouraged to save the amount she didn't spend because of the discount. As such, some embodiments of the invention may promote a cycle whereby the user does the right things financially, raises her financial wellness score and acquires points as a result, and those points continue to support the user's ability to make good financial decisions, leading to the user's financial wellness score continuing to increase over time, and so on.

In some embodiments, a user's personality may affect, at least in part, the communication she receives from the system, experience that is presented to her, to most effectively drive behavioral change. Personalities may be defined by their tendency to demonstrate effective financial consciousness, control and choice. The user's personality may be identified using, for example, behavioral indicators gleaned from transaction data, and self-reported psychographic traits which define what and how different aspects of the overall experience are presented to most effectively drive behavioral change.

Some embodiments of the invention may employ personality archetypes, to identify, for example, those who are methodical in making spending and/or saving decisions, and those who are more impulsive in making such decisions and/or do so inconsistently. This personality defined for the user may drive types of messages that she receives. For example, if the user is identified as one who is methodical in making financial decisions, messages may be sent to that user which promote, as an example, setting aside $10 a month as savings. This type of message may be well-received by this type of personality, because this user is methodical by nature. For someone who makes financial decisions more impulsively, messages may be received which indicate that the system may levy a "spend tax" or establish a "tip jar" to promote the right types of financial behaviors, in a manner which appeals to this person's personality type. Thus, some embodiments of the invention may define the "voice," tools and approach that is taken with respect to each individual user in encouraging good financial decision-making.

V. Implementation Detail

Figure 16:
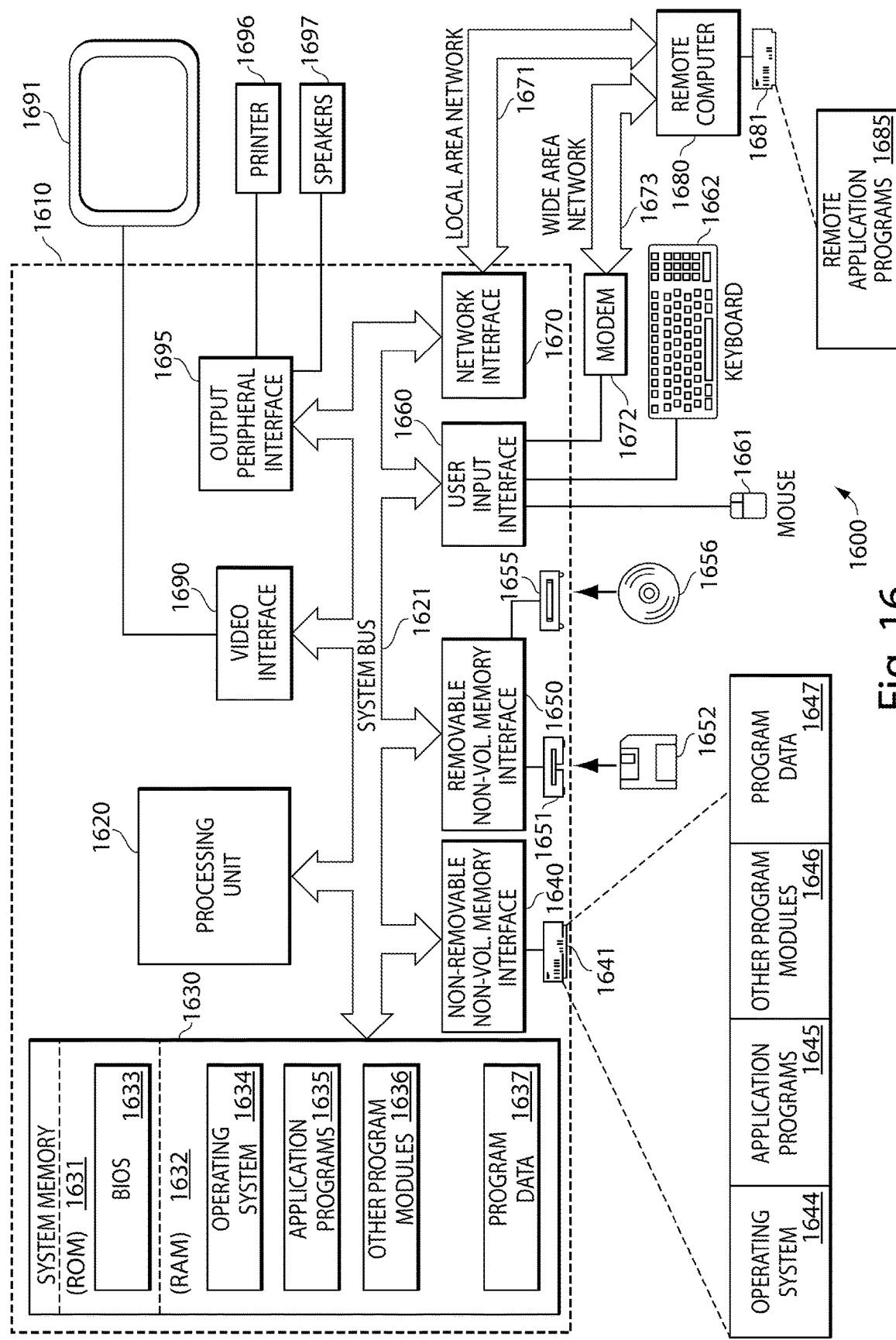
FIG. 16 is a block diagram of an example computer system which may be used to implement certain aspects of the invention.

FIG. 16 illustrates one example of a suitable computing system environment 1600 which may be used to implement aspects of the invention. The computing system environment 1600 is only one example of a suitable computing environment, and is not intended to suggest any limitation as to the scope of use or functionality of the invention. Neither should the computing environment 1600 be interpreted as having any dependency or requirement relating to any one or combination of components illustrated in the exemplary operating environment 1600. In this respect, the invention is operational with numerous other general purpose or special purpose computing system environments or configurations. Examples of well-known computing systems, environments, and/or configurations that may be suitable for use with the invention include, but are not limited to, personal computers, server computers, mobile or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 16 depicts a general purpose computing device in the form of a computer 1610. Components of computer 1610 may include, but are not limited to, a processing unit 1620, a system memory 1630, and a system bus 1621 that couples various system components including the system memory to the processing unit 1620. The system bus 1621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1610 typically includes a variety of computer readable media. Computer readable media can be any available media that can be accessed by computer 1610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 1610. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 1630 includes computer storage media in the form of volatile and/or nonvolatile memory such as read only memory (ROM) 1631 and random access memory (RAM) 1632. A basic input/output system 1633 (BIOS), containing the basic routines that help to transfer information between elements within computer 1610, such as during start-up, is typically stored in ROM 1631. RAM 1632 typically contains data and/or program modules that are immediately accessible to and/or presently being operated on by processing unit 1620. By way of example, and not limitation, FIG. 16 illustrates operating system 1634, application programs 1635, other program modules 1636, and program data 1637.

The computer 1610 may also include other removable/non-removable, volatile/nonvolatile computer storage media. By way of example only, FIG. 16 illustrates a hard disk drive 1641 that reads from or writes to non-removable, nonvolatile magnetic media, a magnetic disk drive 1651 that reads from or writes to a removable, nonvolatile magnetic disk 1652, and an optical disk drive 1655 that reads from or writes to a removable, nonvolatile optical disk 1656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1641 is typically connected to the system bus 1621 through an non-removable memory interface such as interface 1640, and magnetic disk drive 1651 and optical disk drive 1655 are typically connected to the system bus 1621 by a removable memory interface, such as interface 1650.

The drives and their associated computer storage media discussed above and illustrated in FIG. 16, provide storage of computer readable instructions, data structures, program modules and other data for the computer 1610. In FIG. 16, for example, hard disk drive 1641 is illustrated as storing operating system 1644, application programs 1645, other program modules 1646, and program data 1647. Note that these components can either be the same as or different from operating system 1634, application programs 1635, other program modules 536, and program data 1637. Operating system 1644, application programs 1645, other program modules 1646, and program data 1647 are given different numbers here to illustrate that, at a minimum, they are different copies. A user may enter commands and information into the computer 1610 through input devices such as a keyboard 1662 and pointing device 1661, commonly referred to as a mouse, trackball or touch pad. Other input devices (not shown) may include a microphone, joystick, game pad, satellite dish, scanner, or the like. These and other input devices are often connected to the processing unit 1620 through a user input interface 560 that is coupled to the system bus, but may be connected by other interface and bus structures, such as a parallel port, game port or a universal serial bus (USB). A monitor 1691 or other type of display device is also connected to the system bus 1621 via an interface, such as a video interface 1690. In addition to the monitor, computers may also include other peripheral output devices such as speakers 1697 and printer 1696, which may be connected through a output peripheral interface 1695.

The computer 1610 may operate in a networked environment using logical connections to one or more remote computers, such as a remote computer 1680. The remote computer 1680 may be a personal computer, a server, a router, a network PC, a peer device or other common network node, and typically includes many or all of the elements described above relative to the computer 1610, although only a memory storage device 1681 has been illustrated in FIG. 16. The logical connections depicted in FIG. 16 include a local area network (LAN) 1671 and a wide area network (WAN) 1673, but may also include other networks. Such networking environments are commonplace in offices, enterprise-wide computer networks, intranets and the Internet.

When used in a LAN networking environment, the computer 1610 is connected to the LAN 1671 through a network interface or adapter 1670. When used in a WAN networking environment, the computer 1610 typically includes a modem 1672 or other means for establishing communications over the WAN 1673, such as the Internet. The modem 1672, which may be internal or external, may be connected to the system bus 1621 via the user input interface 1660, or other appropriate mechanism. In a networked environment, program modules depicted relative to the computer 1610, or portions thereof, may be stored in the remote memory storage device. By way of example, and not limitation, FIG. 16 illustrates remote application programs 1685 as residing on memory device 1681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer system configured to provide feedback to a user of a mobile device about the user's financial behavior, the computer system comprising:
at least one computer processor programmed to;
identify, from among transactions performed by the user during an ongoing period, transactions of a particular type, each transaction of the particular type having an associated transaction amount;
identify at least one prior period comparable to the ongoing period;
identify, from among transactions performed by the user during the at least one prior period, transactions of the particular type, each transaction of the particular type having an associated transaction amount;
compare the transaction amounts for the identified transactions performed during the ongoing period to the transaction amounts for the identified transactions performed during each identified prior period;
determine, as a result of the comparing, that the user is contemplating performing a transaction; and
in response to the determining, send to the mobile device a promotional offer relating to the contemplated transaction;
wherein the at least one processor is programmed to compare an average of the transaction amounts for the identified transactions performed during the ongoing period to an average of the transaction amounts for the identified transactions performed during each identified prior period, and to send to the mobile device a result of the comparing.

2. The computer system of claim 1, wherein the identified transactions of the particular type include at least one of spending transactions and savings transactions.

3. The computer system of claim 2, wherein the transactions of the particular type include spending transactions and savings transactions, and wherein the at least one processor is programmed to identify at least one first prior period comparable to the ongoing period for the spending transactions and at least one second prior period comparable to the ongoing period for the spending transactions, the at least one first prior period and the at least one second prior period being different.

4. The computer system of claim 1, wherein the ongoing period has a length, and the at least one computer processor is programmed to identify at least one prior period of substantially the same length as the ongoing period.

5. A computer system configured to provide feedback to a user of a mobile device about the user's financial behavior, the computer system comprising:
at least one computer processor programmed to;
identify, from among transactions performed by the user during an ongoing period, transactions of a particular type, each transaction of the particular type having an associated transaction amount;
identify at least one prior period comparable to the ongoing period;
identify, from among transactions performed by the user during the at least one prior period, transactions of the particular type, each transaction of the particular type having an associated transaction amount;
compare the transaction amounts for the identified transactions performed during the ongoing period to the transaction amounts for the identified transactions performed during each identified prior period;
determine, as a result of the comparing, that the user is contemplating performing a transaction; and
in response to the determining, send to the mobile device a promotional offer relating to the contemplated transaction;
wherein the at least one computer processor is programmed to send to the mobile device information usable to render a graphical representation of the result of the comparing;
wherein the at least one computer processor is programmed to send to the mobile device information usable to render a Cartesian coordinate system on which a result of the comparing is plotted; and wherein the ongoing period and the at least one prior period are divisible into time units, and the at least one computer processor is programmed to send to the mobile device a representation of an average of the transaction amounts for the identified transactions performed during the ongoing period and an average of the transaction amounts for the identified transactions performed during each identified prior period plotted on the Cartesian coordinate system by time unit.

6. A computer system configured to provide feedback to a user of a mobile device about the user's financial behavior, the computer system comprising:
   at least one computer processor programmed to;
      identify, from among transactions performed by the user during an ongoing period, transactions of a particular type, each transaction of the particular type having an associated transaction amount;
      identify at least one prior period comparable to the ongoing period;
      identify, from among transactions performed by the user during the at least one prior period, transactions of the particular type, each transaction of the particular type having an associated transaction amount;
      compare the transaction amounts for the identified transactions performed during the ongoing period to the transaction amounts for the identified transactions performed during each identified prior period;
      determine, as a result of the comparing, that the user is contemplating performing a transaction; and
      in response to the determining, send to the mobile device a promotional offer relating to the contemplated transaction;
   wherein the at least one computer processor is programmed to send to the mobile device an indication of a difference between the transaction amounts for the identified transactions performed during the ongoing period and the transaction amounts for the identified transactions performed during each identified prior period; and
   wherein the difference is between an average of the transaction amounts for the identified transactions performed during the ongoing period and an average of the transaction amounts for the identified transactions performed during each identified prior period.

7. At least one non-transitory computer-readable storage medium having instructions encoded thereon which, when executed in a computer system, cause the computer system to perform a method, the method comprising:
   (A) identifying, from among transactions performed by a user during an ongoing period, transactions of a particular type, each transaction of the particular type having an associated transaction amount;
   (B) identifying at least one prior period comparable to the ongoing period;
   (C) identifying, from among transactions performed by the user during the at least one prior period, transactions of the particular type, each transaction of the particular type having an associated transaction amount;
   (D) comparing the transaction amounts for the identified transactions performed during the ongoing period to the transaction amounts for the identified transactions performed during each identified prior period;
   (E) determining, as a result of the comparing, that the user is contemplating performing a transaction; and
   (F) in response to the determining, sending, to a mobile device associated with the user, a promotional offer relating to the contemplated transaction;
wherein (D) comprises comparing an average of the transaction amounts for the identified transactions performed during the ongoing period to an average of the transaction amounts for the identified transactions performed during each identified prior period, and (F) comprises sending to the mobile device a result of the comparing.

8. A method, comprising acts of:
   (A) identifying, from among transactions performed by a user during an ongoing period, transactions of a particular type, each transaction of the particular type having an associated transaction amount;
   (B) identifying at least one prior period comparable to the ongoing period;
   (C) identifying, from among transactions performed by the user during the at least one prior period, transactions of the particular type, each transaction of the particular type having an associated transaction amount;
   (D) comparing the transaction amounts for the identified transactions performed during the ongoing period to the transaction amounts for the identified transactions performed during each identified prior period;
   (E) determining, as a result of the comparing, that the user is contemplating performing a transaction; and
   (F) in response to the determining, sending, to a mobile device associated with the user, a promotional offer relating to the contemplated transaction;
wherein the act (D) comprises comparing an average of the transaction amounts for the identified transactions performed during the ongoing period to an average of the transaction amounts for the identified transactions performed during each identified prior period, and wherein the act (F) comprises sending to the mobile device a result of the comparing.

9. The method of claim 8, wherein the transactions of the particular type include spending transactions and savings transactions, and wherein the act (B) comprises identifying at least one first prior period comparable to the ongoing period for the spending transactions and at least one second prior period comparable to the ongoing period for the spending transactions, the at least one first prior period and the at least one second prior period being different.

10. The method of claim 8, wherein the ongoing period has a length, and wherein the act (B) comprises identifying at least one prior period of substantially the same length as the ongoing period.

11. A method, comprising acts of:
   (A) identifying, from among transactions performed by a user during an ongoing period, transactions of a particular type, each transaction of the particular type having an associated transaction amount;
   (B) identifying at least one prior period comparable to the ongoing period;
   (C) identifying, from among transactions performed by the user during the at least one prior period, transactions of the particular type, each transaction of the particular type having an associated transaction amount;
   (D) comparing the transaction amounts for the identified transactions performed during the ongoing period to the transaction amounts for the identified transactions performed during each identified prior period;
   (E) determining, as a result of the comparing, that the user is contemplating performing a transaction; and (F) in response to the determining, sending, to a mobile device associated with the user, a promotional offer relating to the contemplated transaction;

wherein the act (F) comprises sending to the mobile device information usable to render a graphical representation of the result of the comparing, the graphical representation comprising a Cartesian coordinate system on which a result of the comparing is plotted; and wherein the ongoing period and the at least one prior period are divisible into time units, and the act (F) comprises sending to the mobile device a representation of an average of the transaction amounts for the identified transactions performed during the ongoing period and an average of the transaction amounts for the identified transactions performed during each identified prior period plotted on the Cartesian coordinate system by time unit.

12. A method, comprising acts of:
- (A) identifying, from among transactions performed by a user during an ongoing period, transactions of a particular type, each transaction of the particular type having an associated transaction amount;
- (B) identifying at least one prior period comparable to the ongoing period;
- (C) identifying, from among transactions performed by the user during the at least one prior period, transactions of the particular type, each transaction of the particular type having an associated transaction amount;
- (D) comparing the transaction amounts for the identified transactions performed during the ongoing period to the transaction amounts for the identified transactions performed during each identified prior period;
- (E) determining, as a result of the comparing, that the user is contemplating performing a transaction; and
- (F) in response to the determining, sending, to a mobile device associated with the user, a promotional offer relating to the contemplated transaction;

wherein the act (F) comprises sending to the mobile device an indication of a difference between the transaction amounts for the identified transactions performed during the ongoing period and the transaction amounts for the identified transactions performed during each identified prior period, the difference being between an average of the transaction amounts for the identified transactions performed during the ongoing period and an average of the transaction amounts for the identified transactions performed during each identified prior period.

* * * * *